US011724171B2

(12) United States Patent
Ono et al.

(10) Patent No.: US 11,724,171 B2
(45) Date of Patent: Aug. 15, 2023

(54) REDUCING HUMAN INTERACTIONS IN GAME ANNOTATION

(71) Applicant: New York University, New York, NY (US)

(72) Inventors: Jorge Piazentin Ono, Brooklyn, NY (US); Arvi Gjoka, New York, NY (US); Justin Jonathan Salamon, San Francisco, CA (US); Carlos Augusto Dietrich, Porto Alegre (BR); Claudio T Silva, New York, NY (US)

(73) Assignee: New York University, New York, NY (US)

( * ) Notice: Subject to any disclaimer, the term of this patent is extended or adjusted under 35 U.S.C. 154(b) by 298 days.

(21) Appl. No.: 16/865,230

(22) Filed: May 1, 2020

(65) Prior Publication Data

US 2020/0346093 A1 Nov. 5, 2020

Related U.S. Application Data

(60) Provisional application No. 62/843,279, filed on May 3, 2019.

(51) Int. Cl.
*G06V 20/40* (2022.01)
*A63B 71/06* (2006.01)
(Continued)

(52) U.S. Cl.
CPC .............. *A63B 71/06* (2013.01); *G06V 20/42* (2022.01); *A63B 2071/0694* (2013.01);
(Continued)

(58) Field of Classification Search
CPC ........ G06V 20/42; G06V 20/41; G06V 20/40; G06N 20/00; A63B 71/06;
(Continued)

(56) References Cited

U.S. PATENT DOCUMENTS 8,655,878 B1 * 2/2014 Kulkarni ................. G06F 16/43
707/747
9,186,548 B2 * 11/2015 House .............. H04N 21/23418
(Continued)

OTHER PUBLICATIONS

Chung et al. "Visual Analytics for Multivariate Sorting of Sport Event Data" Oct. 13, 2013 (Year: 2013).*
(Continued)

*Primary Examiner* — Malina D. Blaise
*Assistant Examiner* — Andrew Bodendorf
(74) *Attorney, Agent, or Firm* — John C. Pokotylo; Pokotylo Patent Services

(57) ABSTRACT

The sport data tracking systems available today are based on specialized hardware to detect and track targets on the field. While effective, implementing and maintaining these systems pose a number of challenges, including high cost and need for close human monitoring. On the other hand, the sports analytics community has been exploring human computation and crowdsourcing in order to produce tracking data that is trustworthy, cheaper and more accessible. However, state-of-the-art methods require a large number of users to perform the annotation, or put too much burden into a single user. Example methods, systems and user interfaces that facilitate the creation of tracking data sequences of events (e.g., plays of baseball games) by warm-starting a manual annotation process using a vast collection of historical data are described.

18 Claims, 20 Drawing Sheets

(51) Int. Cl.
*A63B 102/18* (2015.01)
*G09B 19/00* (2006.01)
*H04N 21/845* (2011.01)

(52) U.S. Cl.
CPC ...... *A63B 2102/18* (2015.10); *G09B 19/0038* (2013.01); *H04N 21/8456* (2013.01)

(58) Field of Classification Search
CPC ........ A63B 2071/0694; A63B 2102/18; G09B 19/00; G09B 19/38; H04N 21/8456; G06F 16/7867; G06F 40/169
See application file for complete search history.

(56) References Cited

U.S. PATENT DOCUMENTS

| | | | | |
|---|---|---|---|---|
| 9,740,984 | B2* | 8/2017 | Lucey | G06N 5/043 |
| 10,269,390 | B2* | 4/2019 | DeCaprio | G06V 20/49 |
| 2004/0205482 | A1* | 10/2004 | Basu | G06F 40/169 |
| | | | | 715/201 |
| 2009/0210779 | A1* | 8/2009 | Badoiu | G11B 27/34 |
| | | | | 715/230 |
| 2009/0249185 | A1* | 10/2009 | Datar | G11B 27/11 |
| | | | | 715/201 |
| 2010/0043040 | A1* | 2/2010 | Olsen, Jr. | H04N 21/44012 |
| | | | | 725/110 |
| 2011/0169959 | A1* | 7/2011 | DeAngelis | G06F 16/252 |
| 2013/0086051 | A1* | 4/2013 | Brahms | H04N 21/47 |
| | | | | 707/723 |
| 2014/0115436 | A1* | 4/2014 | Beaver | G06F 40/197 |
| | | | | 715/229 |
| 2015/0356355 | A1* | 12/2015 | Oguchi | G06V 20/42 |
| | | | | 386/230 |
| 2016/0071548 | A1* | 3/2016 | House | G11B 27/036 |
| | | | | 386/201 |
| 2016/0321950 | A1* | 11/2016 | McQuistan | G06F 16/252 |
| 2018/0032858 | A1* | 2/2018 | Lucey | G06F 16/9027 |
| 2018/0061064 | A1* | 3/2018 | Schwartz | H04N 21/84 |
| 2019/0026291 | A1* | 1/2019 | Bhatt | G06F 16/7867 |

OTHER PUBLICATIONS

Xu et al. "A Novel Framework for Semantic Annotation and Personalized Retrieval of Sports Video" IEEE Transactions on Multimedia, vol. 10, No. 3, Apr. 2008 (Year: 2008).*

Lai et al., "Baseball and Tennis Video Annotation with Temporal Structure Decomposition" Media IC and System Lab Graduate Institute of Electronics Engineering and Department of Electrical Engineering National Taiwan University, IEEE 2008 (Year: 2008).*

Losada et al., "BKViz: A Basketball Visual Analysis Tool" IEEE Computer Society Nov./Dec. 2016 (Year: 2016).*

Ono et al., "Baseball Timeline: Summarizing Baseball Plays Into a Static Visualization," Eurographics Conference on Visualization (EuroVis) 2018 (Year: 2018).*

Parry et al., "Hierarchical Event Selection for Video Storyboards with a Case Study on Snooker Video Visualization," IEEE Transactions on Visualization and Computer Graphics, vol. 17, No. 12, Dec. 2011 (Year: 2011).*

Sha et al., "Interactive Sports Analytics: An Intelligent Interface for Utilizing Trajectories for Interactive Sports Play Retrieval and Analytics," ACM Transactions on Computer-Human Interaction, vol. 25, No. 2, Article 13. Publication date: Apr. 2018 (Year: 2018).*

Chung et al., "Knowledge-Assisted Ranking: A Visual Analytic Application for Sports Event Data," Published by the IEEE Computer Society May/Jun. 2016 (Year: 2016).*

Babaguchi et al., "Learning Personal Preference From Viewer's Operations for Browsing and Its Application to Baseball Video Retrieval and Summarization," IEEE Transactions on Multimedia, vol. 9, No. 5, Aug. 2007 (Year: 2007).*

Legg, et al., "Transformation of an Uncertain Video Search Pipeline to a Sketch-Based Visual Analytics Loop," IEEE Transactions on Visualization and Computer Graphics, vol. 19, No. 12, Dec. 2013 (Year: 2013).*

* cited by examiner

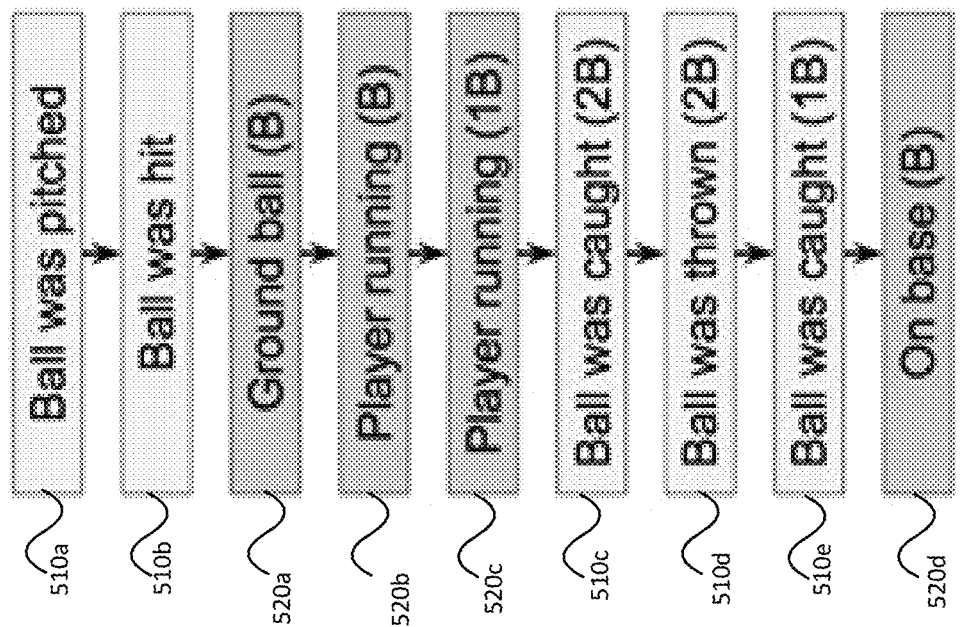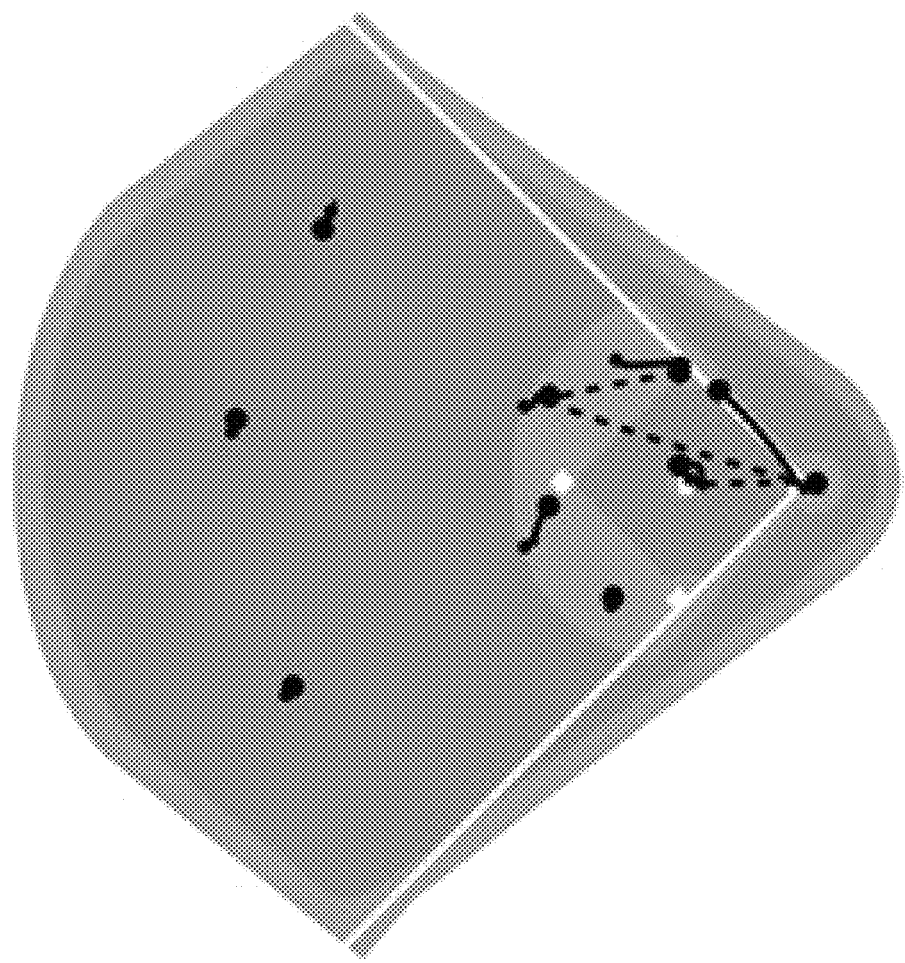
FIGURE 5

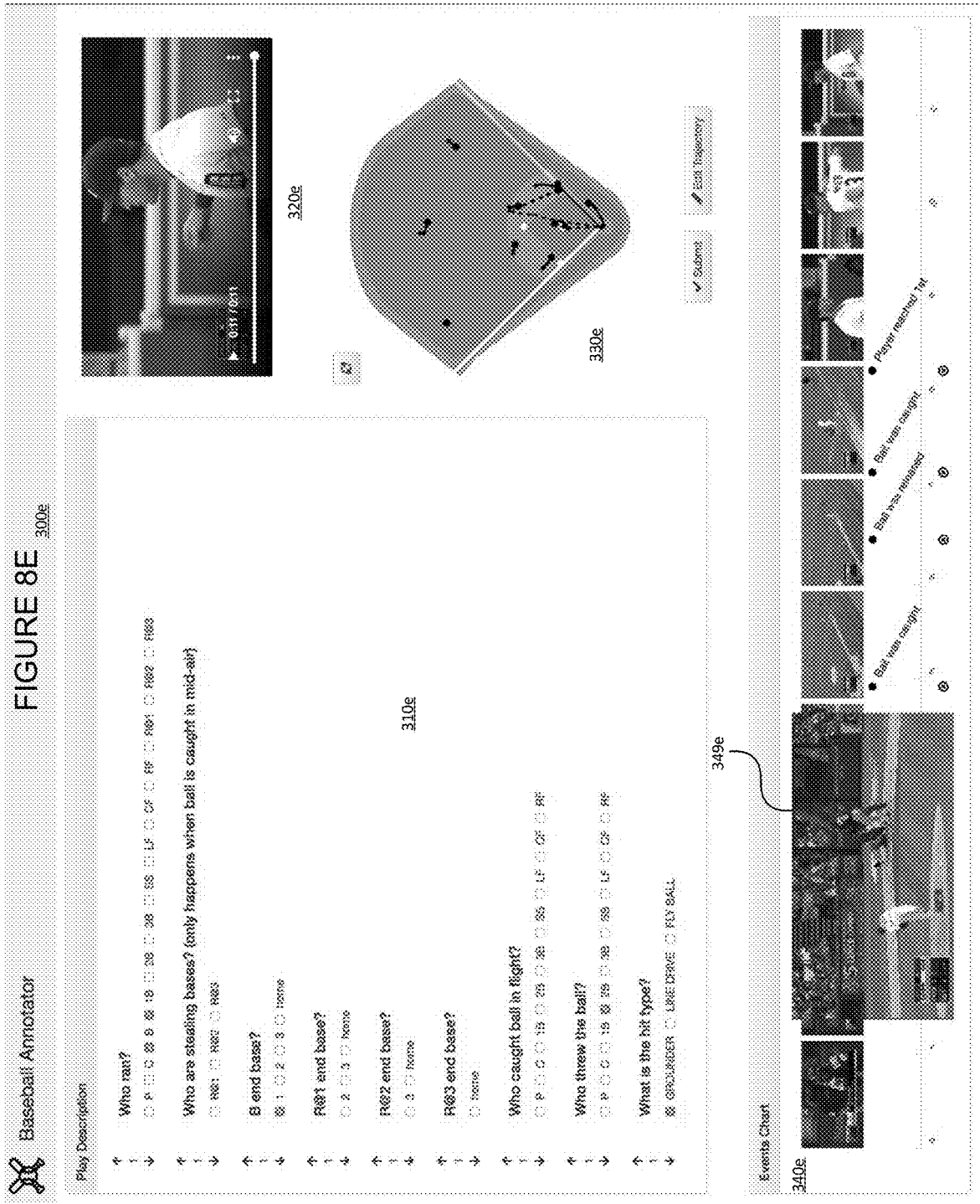

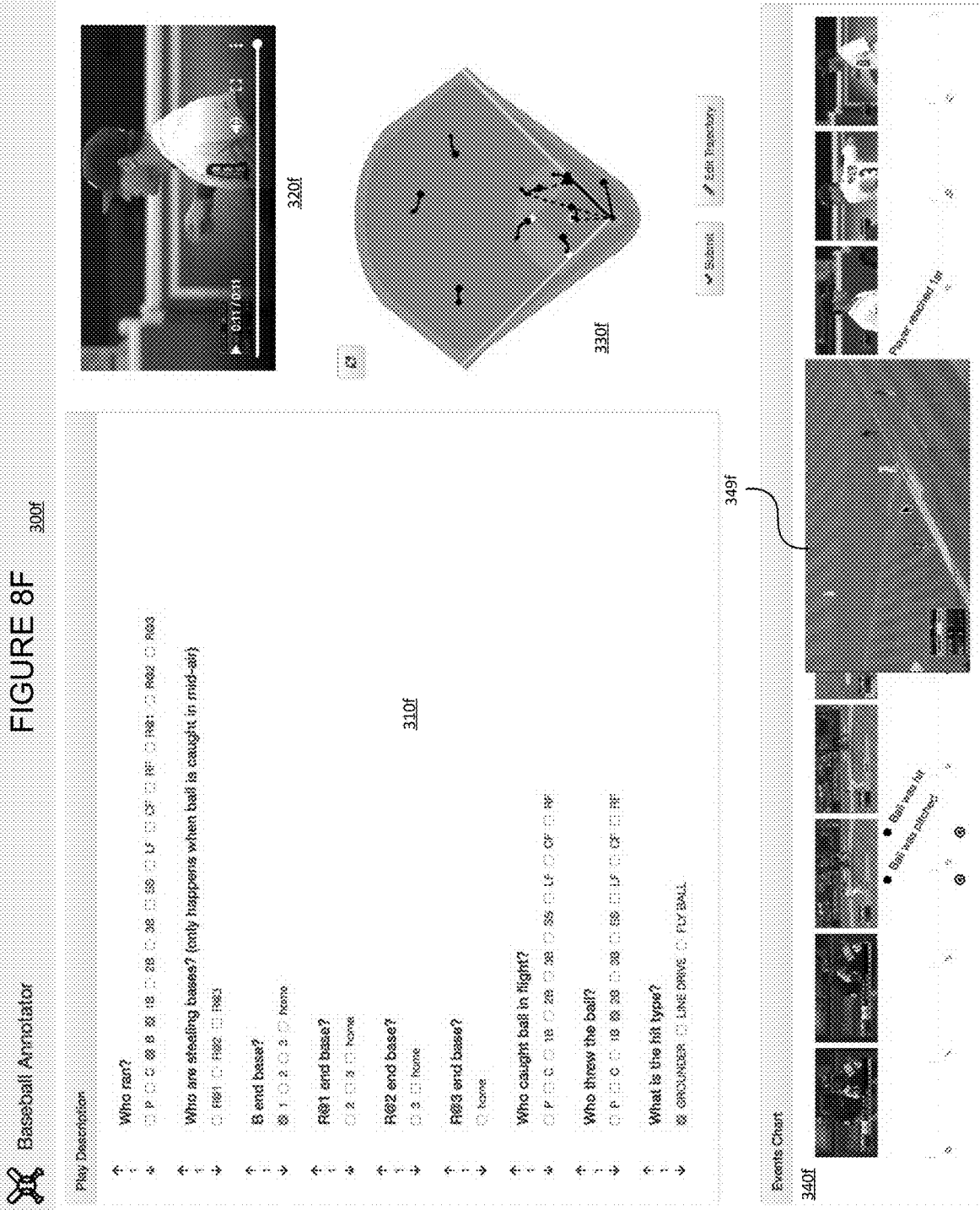

FIGURE 8G

REDUCING HUMAN INTERACTIONS IN GAME ANNOTATION

§ 1. RELATED APPLICATION(S)

This application claims the benefit of U.S. Provisional Patent Application Ser. No. 62/843,279 (referred to as "the '279 provisional" and incorporated herein by reference), filed on May 3, 2019, titled "HISTORY TRACKER: MINIMIZING HUMAN INTERACTIONS IN BASEBALL GAME ANNOTATION" and listing Jorge Piazentin ONO, Arvi GJOKA, Justin Jonathan SALAMON, Carlos Augusto DIETRICH and Claudio T. SILVA as the inventors. Each of the references cited in the '279 provisional is incorporated herein by reference. The present invention is not limited to requirements of the particular embodiments described in the '279 provisional.

§ 2. BACKGROUND OF THE INVENTION

§ 2.1 Field of the Invention

The present invention concerns the manual annotation of a "sequence" including "events" (which might be defined as {action, actor} pairs) such as, for example, a "sports play" including "events" (which might be defined as {action, player}). More specifically, the present invention concerns providing assistance for such manual annotation.

§ 2.2 Background Information

Sports analytics have changed the way sports are played, planned and watched. Furthermore, the demand for precise, accurate and consistent data continues to grow. It is widely accepted that sports tracking data has been revolutionizing sports analytics with its unprecedented level of detail. Instead of relying on derived statistics, experts can use that data to "reconstruct reality" and create their own statistics or analysis without prior constraints. (See, e.g., the document, C. Dietrich, D. Koop, H. T. Vo, and C. T. Silva, 2014, "Baseball4D: A Tool for Baseball Game Reconstruction Amp; Visualization," 2014 *IEEE Conference on Visual Analytics Science and Technology (VAST)*, 23-32 (incorporated herein by reference).) Moreover, tracking data can be used for training "simulation engines", that can predict game developments and enable new hypothesis to be tested. (See, e.g., the document, T. Seidl, A. Cherukumudi, A. Hartnett, P. Carr, and P. Lucey, 2018, "Bhostgusters: Realtime Interactive Play Sketching with Synthesized NBA Defenses," *MIT Sloan Sports Analytics Conference*, 13 (incorporated herein by reference).) While teams and sport organizations rely on multiple sources of data, such as smart watches, heart rate monitors and sensing textiles (See, e.g., the documents: S. Nylander, J. Tholander, F. Mueller, and J. Marshall, 2014, "HCI and Sports," *CHI '14 Extended Abstracts on Human Factors in Computing Systems* (CHI EA '14). ACM, New York, N.Y., USA, 115-118 (incorporated herein by reference); and T. Page, 2015, "Applications of Wearable Technology in Elite Sports," *Journal on Mobile Applications and Technologies* 2, 1 (April 2015), 1-15 (incorporated herein by reference).), tracking data produced by specialized tracking systems may be considered the primary source of data in professional sports. Modern tracking systems use specialized sensors, such as high-definition cameras, speed radars, and/or RFID technology, to collect movement data with precise measurements and high sampling rates. (See, e.g., the documents: C. Dietrich, D. Koop, H. T. Vo, and C. T. Silva, 2014, "Baseball4D: A Tool for Baseball Game Reconstruction Amp; Visualization," 2014 *IEEE Conference on Visual Analytics Science and Technology (VAST)*, 23-32 (incorporated herein by reference); and C. B. Santiago, A. Sousa, M. L. Estriga, L. P. Reis, and M. Lames, 2010, "Survey on Team Tracking Techniques Applied to Sports," 2010 *International Conference on Autonomous and Intelligent Systems, AIS* 2010, 1-6 (incorporated herein by reference).) Some examples of commercial tracking technologies are Pitch F/X and ChyronHego for baseball 10 (See, e.g., the documents: ChyronHego, 2016, "TRACAB Optical Tracking," http://chyronhego.com/sports-data/tracab (incorporated herein by reference); "Sportvision," 2016, PITCHf/x, http://www.sportvision.com/baseball/pitchfx (incorporated herein by reference).), and STATS Sport VU for soccer, basketball and American football (See, e.g., the document, STATS, 2016, "SportVU Player Tracking|STATS SportVU Tracking Cameras," http://www.stats.com/sportvu/sportvu-basketball-media/(incorporated herein by reference).).

Tracking systems produce a valuable stream of data for analysis by sports teams. Tracking data is commonly used in a wide array of applications in sports, both for entertainment purposes and for expert analysis. In the United States, some of the major examples are Major League Baseball (MLB), National Football League (NFL) and National Basketball Association (NBA). Since 2015, MLB has been using its tracking infrastructure, MLB StatCast, to augment its broadcasting videos and generate new content to the public (See, e.g., the documents: M. Lage, J. P. Ono, D. Cervone, J. Chiang, C. Dietrich, and C. T. Silva, 2016, "StatCast Dashboard: Exploration of Spatiotemporal Baseball Data," *IEEE Computer Graphics and Applications* 36, 5 (September 2016), 28-37 (incorporated herein by reference); and USA-Today, 2015, "Data Deluge: MLB Rolls Out Statcast Analytics on Tuesday," https://www.usatoday.com/story/sports/mlb/2015/04/20/data-deluge-mlb-rolls-out-statcast-analytics-on-tuesday/26097841/(incorporated herein by reference).). NFL and NBA also deploy tracking technologies to augment their broadcastings and compute statistics for fans (See, e.g., the documents: ESPN, 2012, "Player Tracking Transforming NBA Analytics," http://www.espn.com/blog/playbook/tech/post/_/id/492/492 (incorporated herein by reference); and NFL, 2018, "Glossary|NFL Next Gen Stats," https://nextgenstats.nfl.com/glossary (incorporated herein by reference).). Sports teams and leagues use tracking data to analyze and improve player performance and game strategies.

A vast collection of works in the literature show how tracking data can be used to inspect games in more detail; information visualization techniques enable the visual spatial analysis of games, while machine learning and statistics allow for predictions and inferences to be computed on games. Much of the recent work in sports visualization is based on trajectory data. Some examples in the include tennis (See, e.g., the document, G. Pingali, A. Opalach, Y. Jean, and I. Carlbom, 2001, "Visualization of Sports Using Motion Trajectories: Providing Insights into Performance, Style, and Strategy," *Proceedings of the Conference on Visualization '01 (VIS '01)*, IEEE Computer Society, Washington, D.C., USA, 75-82 (incorporated herein by reference).), baseball (See, e.g., the documents: C. Dietrich, D. Koop, H. T. Vo, and C. T. Silva, 2014, "Baseball4D: A Tool for Baseball Game Reconstruction Amp; Visualization," 2014 *IEEE Conference on Visual Analytics Science and Technology (VAST)*, 23-32 (incorporated herein by reference); M. Lage, J. P. Ono, D. Cervone, J. Chiang, C. Dietrich, and C. T. Silva, 2016, "StatCast Dashboard: Exploration of Spatiotemporal Baseball Data," *IEEE Computer Graphics and Applications* 36, 5 (September 2016), 28-37 (incorporated herein by reference); and J. P. Ono, C.

Dietrich, and C. T. Silva, 2018, "Baseball Timeline: Summarizing Baseball Plays Into a Static Visualization," *Computer Graphics Forum* 37, 3 (June 2018), 491-501 (incorporated herein by reference).), basketball (See, e.g., the documents: K. Goldsberry, 2012, "Courtvision: New Visual and Spatial Analytics for the NBA," *MIT Sloan Sports Analytics Conference* (incorporated herein by reference); L. Sha, P. Lucey, Y. Yue, X. Wei, J. Hobbs, C. Rohlf, and S. Sridharan, "Interactive Sports Analytics: An Intelligent Interface for Utilizing Trajectories for Interactive Sports Play Retrieval and Analytics," *ACM Transactions on Computer-Human Interaction* 25, 2 (April 2018), 1-32 (incorporated herein by reference); and R. Theron and L. Casares, 2010, "Visual Analysis of Time-Motion in Basketball Games," *International Symposium on Smart Graphics*, Vol. 6133. 196-207 (incorporated herein by reference).), soccer (See, e.g., the documents: C. Perin, R. Vuillemot, and J. D. Fekete, 2013, "SoccerStories: A Kick-off for Visual Soccer Analysis," *IEEE Transactions on Visualization and Computer Graphics* 19, 12 (December 2013), 2506-2515 (incorporated herein by reference); M. Stein, H. Janetzko, T. Breitkreutz, D. Seebacher, T. Schreck, M. Grossniklaus, I. D. Couzin, and D. A. Keim, 2016, "Director's Cut: Analysis and Annotation of Soccer Matches," *IEEE Computer Graphics and Applications* 36, 5 (September 2016), 50-60 (incorporated herein by reference); and M. Stein, H. Janetzko, A. Lamprecht, T. Breitkreutz, P. Zimmermann, B. Goldlucke, T. Schreck, G. Andrienko, M. Grossniklaus, and D. A. Keim, "Bring it to the Pitch: Combining Video and Movement Data to Enhance Team Sport Analysis," *IEEE Transactions on Visualization and Computer Graphics* 24, 1 (2018), 13-22 (incorporated herein by reference).), hockey (See, e.g., the document, H. Pileggi, C. D. Stolper, J. M. Boyle, and J. T. Stasko, 2012, "SnapShot: Visualization to Propel Ice Hockey Analytics," *IEEE Transactions on Visualization and Computer Graphics* 18, 12 (December 2012), 2819-2828 (incorporated herein by reference).) and rugby (See, e.g., the documents: D. H. Chung, P. A. Legg, M. L. Parry, R. Bown, I. W. Griffiths, R. S. Laramee, and M. Chen, 2015, "Glyph Sorting: Interactive Visualization for Multi-Dimensional Data," *Information Visualization* 14, 1 (2015), 76-90 (incorporated herein by reference); and D. H. S. Chung, M. L. Parry, I. W. Griffiths, R. S. Laramee, R. Bown, P. A. Legg, and M. Chen, 2016, "Knowledge-Assisted Ranking: A Visual Analytic Application for Sports Event Data," *IEEE Computer Graphics and Applications* 36, 3 (2016), 72-82 (incorporated herein by reference).). While each of those works are adapted to better illustrate their respective sports, their main focus is on clearly conveying the trajectories, or metrics computed from trajectories, to the user.

Meanwhile, statistics and machine learning are used to make predictions and inferences on top of the sports tracking data. Ghosting is a technique that uses machine learning to compute optimal player trajectories and predict play outcomes, and has been applied to basketball (See, e.g., the document, T. Seidl, A. Cherukumudi, A. Hartnett, P. Carr, and P. Lucey, 2018, "Bhostgusters: Realtime Interactive Play Sketching with Synthesized NBA Defenses," *MIT Sloan Sports Analytics Conference*, 13 (incorporated herein by reference).) and soccer (See, e.g., the document, H. M. Le, P. Carr, Y. Yue, and P. Lucey, 2017, "Data-Driven Ghosting Using Deep Imitation Learning," *MIT Sloan Sports Analytics Conference*, 15 (incorporated herein by reference).) tracking data. Statistical analysis has been applied to basketball to evaluate players shooting ability and compare defensive strategies (See, e.g., the documents: D. Cervone, A. D'Amour, L. Bornn, and K. Goldsberry, 2014, "POINTWISE: Predicting Points and Valuing Decisions in Real Time with NBA Optical Tracking Data," *MIT Sloan Sports Analytics Conference* 28 (incorporated herein by reference); and A. McIntyre, J. Brooks, J. Guttag, and J. Wiens, 2016, "Recognizing and Analyzing Ball Screen Defense in the NBA," *MIT Sloan Sports Analytics Conference*, 10 (incorporated herein by reference).). Cross et al. (See, e.g., the document, J. Cross and D. Sylvan, 2015, "Modeling Spatial Batting Ability Using a Known Covariance Matrix," *Journal of Quantitative Analysis in Sports* 11, 3 (2015), 155-167 (incorporated herein by reference).) studied baseball tracking data to evaluate batter's hot and cold zones. Bialkowski et al. (See, e.g., the document, A. Bialkowski, P. Lucey, P. Carr, Y. Yue, and I. Matthews, 2014, "Win at Home and Draw Away: Automatic Formation Analysis Highlighting the Differences in Home and Away Team Behaviors," *MIT Sloan Sports Analytics Conference* 28 (incorporated herein by reference).) used expectation maximization on soccer tracking data to detect play formations across time, and discovered that teams play differently at home and away, being more forward at home.

Currently, most of the sports tracking data produced by mainstream media are generated by automated methods. Commercial systems, such as Pitch F/X (See, e.g., the document, "Sportvision," 2016, PITCHf/x, http://www.sportvision.com/baseball/pitchfx (incorporated herein by reference).), ChyronHego TRACAB (See, e.g., the document, ChyronHego, 2016, "TRACAB Optical Tracking," http://chyronhego.com/sports-data/tracab (incorporated herein by reference).), and STATS Sport VU (See, e.g., the document, STATS, 2016, "SportVU Player Tracking|STATS SportVU Tracking Cameras," http://www.stats.com/sportvu/sportvu-basketball-media/ (incorporated herein by reference).) are used at every game from major league sports teams, producing huge amounts of data for analysis. For a review on automatic tracking methodologies, please refer to the surveys by Santiago et al. (See, e.g., the document, C. B. Santiago, A. Sousa, M. L. Estriga, L. P. Reis, and M. Lames, 2010, "Survey on Team Tracking Techniques Applied to Sports," 2010 *International Conference on Autonomous and Intelligent Systems, AIS* 2010, 1-6 (incorporated herein by reference).) and Kamble et al. (See, e.g., the document, P. R. Kamble, A. G. Keskar, and K. M. Bhurchandi, 2017, "Ball Tracking in Sports: A Survey," *Artificial Intelligence Review* (October 2017) (incorporated herein by reference).).

Unfortunately, however, implementing and maintaining such tracking systems pose three major difficulties. First, they are expensive. Major League Baseball's Statcast, for example, was an investment of tens of millions of dollars. (See, e.g., the document, USAToday, 2015, "Data Deluge: MLB Rolls Out Statcast Analytics on Tuesday," https://www.usatoday.com/story/sports/mlb/2015/04/20/ data-deluge-mlb-rolls-out-statcast-analytics-on-tuesday/26097841/ (incorporated herein by reference).) Although such costs might not be a problem for professional sports teams and leagues, they likely pose a major impediment for the use of tracking systems by smaller organizations or amateurs. Second, the quality of the tracking data is often affected by multiple hard-to-control factors (See, e.g., the documents: R. Arthur, 2016, "MLB's Hit-Tracking Tool Misses A Lot Of Hits," https://fivethirtyeight.com/features/mlbs-hit-tracking-tool-misses-a-lot-of-hits/ (incorporated herein by reference); C. Dietrich, D. Koop, H. T. Vo, and C. T. Silva, 2014, "Baseball4D: A Tool for Baseball Game Reconstruction Amp; Visualization," 2014 *IEEE Conference on Visual Analytics Science and Technology (VAST)*, 23-32 (incorporated herein by reference); M. Lage, J. P. Ono, D. Cervone, J. Chiang, C. Dietrich, and C. T. Silva, 2016, "StatCast Dashboard: Exploration of Spatiotemporal Baseball Data," *IEEE Computer Graphics and Applications* 36, 5 (September 2016), 28-37 (incorporated herein by reference); and C. Perin, R. Vuillemot, and J. D. Fekete, 2013, "Real-Time Crowdsourcing of Detailed Soccer Data," *What's the score? The 1st Workshop on Sports Data Visualization* (incorporated herein by reference).), including changes in lighting, camera position(s) in relation to the field, occlusion and small objects. Such factors can result in missing or noisy data. Third, tracking systems are not used to produce tracking data for historical plays. At the same time, commentators and analysts often reference older games during their analysis. However, if the game happened before the tracking system was implemented, it is not possible to quantitatively compare the plays.

Adding manual annotation is a promising direction to address the foregoing difficulties. A number of studies have explored how human annotators can be used to create reliable sports data from scratch. Before the development of automatic tracking systems, experts had to perform the annotation of players and ball position manually. (See, e.g., the document, C. B. Santiago, A. Sousa, M. L. Estriga, L. P. Reis, and M. Lames, 2010, "Survey on Team Tracking Techniques Applied to Sports," 2010 *International Conference on Autonomous and Intelligent Systems, AIS* 2010, 1-6 (incorporated herein by reference).) While professional sports leagues have shifted towards automated methods, they are very protective of their data, only sharing small aggregated statistics with the public. Therefore, manual tracking is still used when the data is not readily available, such as in the context of academic research and amateur teams. (See, e.g., the documents: C. Perin, R. Vuillemot, and J. D. Fekete, 2013, "Real-Time Crowdsourcing of Detailed Soccer Data," *What's the score? The 1st Workshop on Sports Data Visualization* (incorporated herein by reference); and C. Perin, R. Vuillemot, C. D. Stolper, J. T. Stasko, J. Wood, and S. Carpendale, 2018, "State of the Art of Sports Data Visualization," *Computer Graphics Forum* 37, 3 (June 2018), 663-686 (incorporated herein by reference).) Spencer et al. (See, e.g., the document, M. Spencer, C. Rechichi, S. Lawrence, B. Dawson, D. Bishop, and C. Goodman, 2005, "Time-Motion Analysis of Elite Field Hockey During Several Games in Succession: A Tournament Scenario," *Journal of Science and Medicine in Sport* (2005), 10 (incorporated herein by reference).) hand annotated hockey players movement and speed throughout multiple games in order to analyze how player performance changes during a tournament. Bogdanis et al. (See, e.g., the document, G. C. Bogdanis, V. Ziagos, M. Anastasiadis, and M. Maridaki, 2007, "Effects of Two Different Short-Term Training Programs on the Physical and Technical Abilities of Adolescent Basketball Players," *Journal of Science and Medicine in Sport* 10, 2 (April 2007), 79-88 (incorporated herein by reference).) hand annotated basketball games in order to compare the effects of training programs on players. The annotation was made offline, using video footage of the game and training sessions, and the experts had to collect and annotate both player trajectories and actions such as, for example, dribbles, and offensive/defensive moves.

Manual annotation can be done by a single annotator (See, e.g., the documents: G. C. Bogdanis, V. Ziagos, M. Anastasiadis, and M. Maridaki, 2007, "Effects of Two Different Short-Term Training Programs on the Physical and Technical Abilities of Adolescent Basketball Players," *Journal of Science and Medicine in Sport* 10, 2 (April 2007), 79-88 (incorporated herein by reference); T. Seidl, A. Cherukumudi, A. Hartnett, P. Carr, and P. Lucey, 2018, "Bhostgusters: Realtime Interactive Play Sketching with Synthesized NBA Defenses," *MIT Sloan Sports Analytics Conference*, 13 (incorporated herein by reference); and M. Spencer, C. Rechichi, S. Lawrence, B. Dawson, D. Bishop, and C. Goodman, 2005, "Time-Motion Analysis of Elite Field Hockey During Several Games in Succession: A Tournament Scenario," *Journal of Science and Medicine in Sport* (2005), 10 (incorporated herein by reference).), or by a collection of annotators through crowdsourcing (See, e.g., the documents, C. Perin, R. Vuillemot, and J. D. Fekete, 2013, "Real-Time Crowdsourcing of Detailed Soccer Data," *What's the score? The 1st Workshop on Sports Data Visualization* (incorporated herein by reference); and C. Vondrick, D. Ramanan, and D. Patterson, 2010, "Efficiently Scaling Up Video Annotation with Crowdsourced Marketplaces," *European Conference on Computer Vision* Springer, 610-623 (incorporated herein by reference).). While individual manual annotation can be a reliable source of tracking data, it puts a major burden into a single person.

Crowdsourcing has also been used to generate sports data. (See, e.g., the documents: C. Perin, R. Vuillemot, and J. D. Fekete, 2013, "Real-Time Crowdsourcing of Detailed Soccer Data," *What's the score? The 1st Workshop on Sports Data Visualization* (incorporated herein by reference); A. Tang and S. Boring, 2012, "#EpicPlay: Crowd-Sourcing Sports Video Highlights," *Proceedings of the SIGCHI Conference on Human Factors in Computing Systems*, ACM, 1569-1572 (incorporated herein by reference); G. Van Oorschot, M. Van Erp, and C. Dijkshoorn, 2012, "Automatic Extraction of Soccer Game Events from Twitter," *Proceedings of the Workshop on Detection, Representation, and Exploitation of Events in the Semantic Web (DeRiVE 2012)* 902 (2012), 21-30 (incorporated herein by reference); and C. Vondrick, D. Ramanan, and D. Patterson, 2010, "Efficiently Scaling Up Video Annotation with Crowdsourced Marketplaces," *European Conference on Computer Vision* Springer, 610-623 (incorporated herein by reference).) Crawling twitter streams enable the extraction of game highlights, where hashtag peaks might indicate the most exciting moments in the game. (See, e.g., the documents: A. Tang and S. Boring, 2012, "#EpicPlay: Crowd-Sourcing Sports Video Highlights," *Proceedings of the SIGCHI Conference on Human Factors in Computing Systems*, ACM, 1569-1572 (incorporated herein by reference); and G. Van Oorschot, M. Van Erp, and C. Dijkshoorn, 2012, "Automatic Extraction of Soccer Game Events from Twitter," *Proceedings of the Workshop on Detection, Representation, and Exploitation of Events in the Semantic Web (DeRiVE 2012)* 902 (2012), 21-30 (incorporated herein by reference).) While this technique does not produce tracking data, highlights are a valuable data source that can be gathered from a publicly available platform. Vondrick et al. (See, e.g., the document, C. Vondrick, D. Ramanan, and D. Patterson, 2010, "Efficiently Scaling Up Video Annotation with Crowdsourced Marketplaces," *European Conference on Computer Vision* Springer, 610-623 (incorporated herein by reference).) investigated the use of crowdsourcing interfaces to annotate basketball videos. The authors divided the work of labeling video data into microtasks that could be completed by a large number of human annotators, and showed that combining the output of the multiple users resulted in more accurate tracking data. Perin et al. (See, e.g., the document, C. Perin, R. Vuillemot, and J. D. Fekete, 2013, "Real-Time Crowdsourcing of Detailed Soccer Data," *What's the score? The 1st Workshop on Sports Data Visu-*

*alization* (incorporated herein by reference).) followed the same principles, but extended this approach to enable the real-time annotation of games. In their system, each person is asked to annotate either one player or one event, and high accuracy was obtained by averaging annotations. While micro-tasks made the annotation process easier, it has the downside of requiring a large number of users to produce a single play annotation. Thus, crowdsourcing systems can split the annotation process into many tasks that can be completed quickly. The downside of this approach is that a large number of volunteers might be necessary to produce reliable data.

Thus, hand annotating sports from scratch is a difficult and time consuming task commonly done offline by experts, who have to repeatedly watch recordings of the games in order to produce a good approximation of the players movement. (Recall, e.g., the document, C. B. Santiago, A. Sousa, M. L. Estriga, L. P. Reis, and M. Lames, 2010, "Survey on Team Tracking Techniques Applied to Sports," 2010 *International Conference on Autonomous and Intelligent Systems, AIS* 2010, 1-6 (incorporated herein by reference).)

§ 3. SUMMARY OF THE INVENTION

Example embodiments consistent with the present application help a user to annotate plays of a sporting game by providing a computer-implemented method comprising: (a) selecting video and/or audio of a sequence of events to be manually annotated by a user; (b) receiving information about at least one event of the sequence of events from the user; (c) retrieving, using the received information about at least one event of the sequence of events, a set of at least one candidate sequence from a corpus dataset; (d) selecting one of the at least one candidate sequence of the retrieved set to the user as a representative sequence; and (e) using the representative sequence to prepopulate a manual annotation of the sequence by the user.

In at least some example embodiments, the method further includes (f) receiving manual user input to edit the prepopulated manual annotation of the sequence where it does not match the video of the play.

In at least some example embodiments, the method further includes: (f) receiving manual user input to revise information about at least one event of the sequence of events from the user; (g) retrieving, using the received revised information about at least one event of the sequence of events, a new set of at least one candidate sequence from a corpus dataset; (h) selecting one of the at least one candidate sequence of the retrieved new set to the user as a new representative sequence; and (i) using the new representative sequence to re-prepopulate a manual annotation of the sequence by the user.

In at least some example embodiments, the method further includes presenting a set of questions about the sequence to the user, wherein the act of receiving information defining at least one event of the sequence from the user is performed based on answers provided by the user responsive to the presenting the set of questions about the sequence to the user. In at least some such embodiments, the set of questions presented to the user are ordered by their overall impact on narrowing the set of at least one candidate sequence retrieved from the corpus dataset. For example, if the sequence is a baseball play, the ordered set of questions may include (1) who ran, (2) who are stealing bases, (3) what are end bases of runners, (4) who caught the batted ball in flight, (5) who threw the ball, and/or (6) what is the hit type. In at least some example embodiments, the sequence is a sports play, and the set of questions is ordered such that questions directly related to an outcome of the sports play are asked before questions about details of the sports play.

In at least some example embodiments, each event of the sequence of events is defined by at least one {action, actor} pair. For example, the actor may be one of (A) a sports player position, (B) a sports player name, (C) a sports player type, (D) a ball, (E) a puck, and (F) a projectile.

In at least some example embodiments, each event of the sequence of events has a time stamp measuring a time relative to a starting point.

In at least some example embodiments, the representative one of the at least one candidate sequences of the retrieved set presented to the user includes an events chart including (1) frames of video and (2) at least one event representation, each associated with at least one of the frames of video. In at least some such example embodiments, the a temporal sequence of event representations of the events chart are aligned using a start marker, and the start marker is determined from at least one of (A) a predetermined distinctive sound in the video and/or audio of the sequence of events, (B) a predetermined distinctive sound sequence in the video and/or audio of the sequence of events, (C) a predetermined distinctive image in the video and/or audio of the sequence of events, (D) a predetermined distinctive image sequence in the video and/or audio of the sequence of events, and (E) a manually entered demarcation and/or audio of the sequence of events. In at least some such example embodiments, the method further includes: (f) receiving a user input manipulating an event representation included in the events chart to change a frame of video of the events chart with which the event representation is associated; (g) performing a temporal query to retrieve, using the received user input for manipulating the event presentation, a new set of at least one candidate sequence; (h) selecting one of the at least one candidate sequence of the retrieved new set to the user as a new representative sequence; and (i) using the new representative sequence to re-prepopulate a manual annotation of the sequence by the user.

In at least some example embodiments, each sequence is represented as a bit sequence indexing different events, and the set of at least one candidate play belongs to a cluster with the largest number of bits of the bit sequence in common with the query.

In at least some example embodiments, the events of the sequence are weighted by the user in order to allow the user to increase or decrease the importance of certain events used to retrieve, using the received information defining the at least one event of the sequence, a set of at least one candidate sequence from the corpus dataset.

In at least some example embodiments, the representation of a selected one of the at least one candidate sequence of the retrieved set presented to the user includes a timeline of the selected sequence.

In at least some example embodiments, the sequence is a sports play, and the representation of a selected one of the at least one candidate sequence of the retrieved set presented to the user includes a plan view of a field of play, the plan view including trajectories of events associated with the selected play.

Any of the example methods may be implemented as stored program instructions executed by one or more processors. The program instructions may be stored on a non-transitory computer-readable medium.

§ 4. BRIEF DESCRIPTION OF THE DRAWINGS

FIG. 5 illustrates an example of a "play" (left) and the resulting set of "events" (right).

FIGS. 8A-8J are example display screens illustrating user interface displays that may be used in the example method of FIG. 4.

§ 5. DETAILED DESCRIPTION

Figure 1:
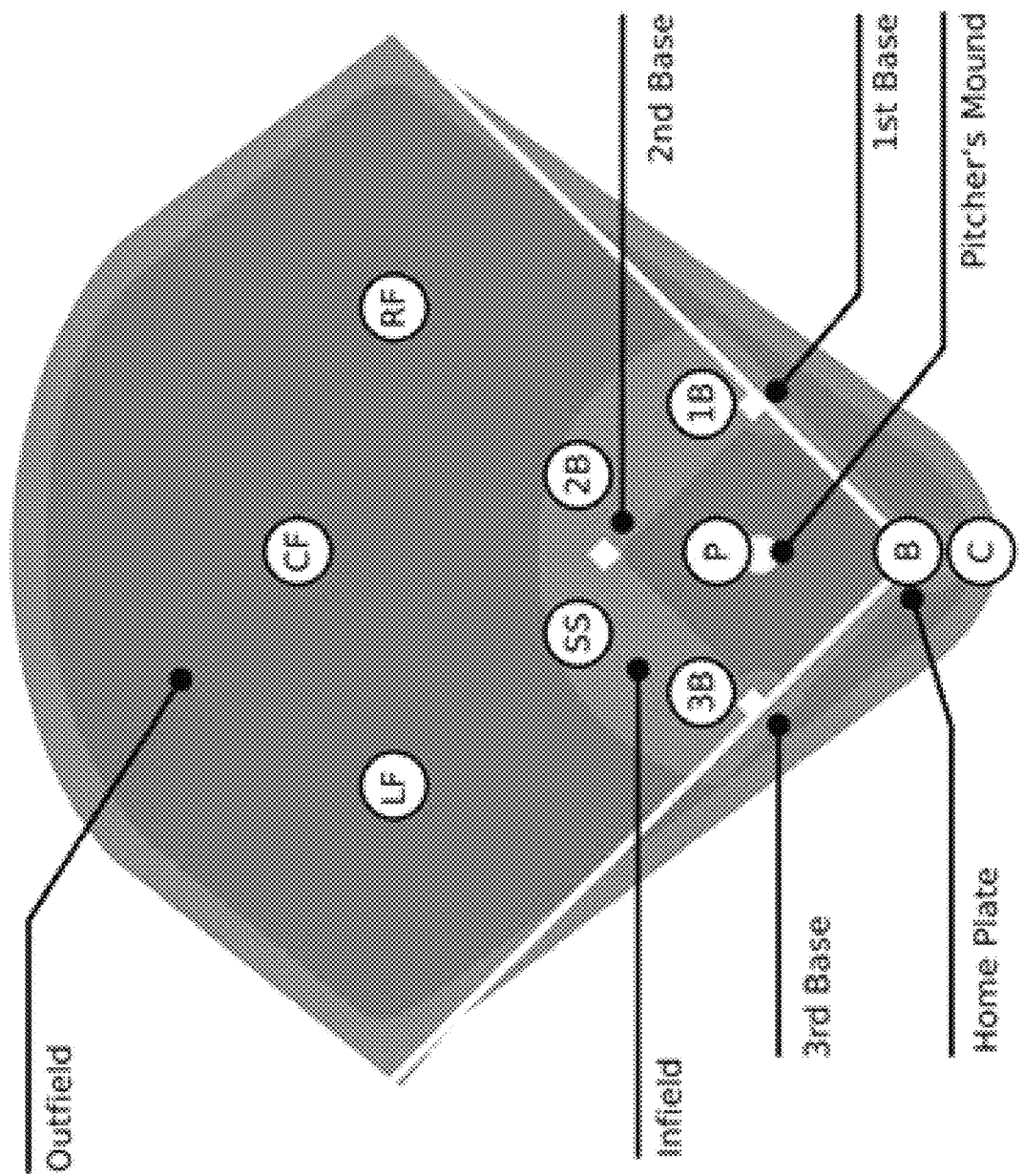
FIG. 1 illustrates a baseball field schema.

The present description may involve novel methods, apparatus, message formats, and/or data structures for assisting the manual annotation of plays, such as sports plays for example. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§ 5.1 Definitions

A "trajectory" includes lines, curves, etc., showing the path of a "target" (i.e., the object or person being annotated such as, for example, an actor, such as a sports player, or ball, or puck, etc.) within an environment (e.g., a sports field).

A "play" may also include a geometry. Aspects of a play's geometry may be manually entered, extracted from one or more other play(s), and/or calculated (e.g., derived from time stamps, distances, velocities, angles of flight, etc.). A play may include a sequence of "events."

Similarly, a "sequence" may also include a geometry. Aspects of a sequence's geometry may be manually entered, extracted from one or more other sequences, and/or calculated (e.g., derived from time stamps, distances, velocities, angles of flight, etc.). A "sequence" may include a set of one or more "events."

"Events" of a play may include, for example, an action such as ball pitched, ball hit, ball caught, ball thrown, ball kicked, ball deflected, ball shot, etc.

§ 5.2 Baseball Overview

Although the example annotation methods described herein are general and can be applied to other team sports, the example methods focus on baseball. Therefore, baseball and its basic rules are introduced briefly. (For more details, please see the documents: Major League Baseball, 2016, "Official baseball rules," http://mlb.mlb.com/mlb/official_info/official_rules/official_rules.jsp (incorporated herein by reference); and P. E. Meltzer and R. Marazzi, 2013, *So You Think You Know Baseball? A Fan's Guide to the Official Rules* (1 edition ed.). W. W. Norton & Company, New York, N.Y. (incorporated herein by reference).)

Baseball is a bat-and-ball game that is played on a field shaped like a circular quadrant, also called diamond. FIG. 1 illustrates a baseball field schema. Four bases are placed at the corners of a ninety-foot square at the bottom of the diamond. The bases are labeled in counterclockwise order starting at the bottom as home plate, first base, second base, and third base. The area just above the square is called "infield," while the area above the infield dirt is called the "outfield."

During the game of baseball, two teams alternate between the nine defensive and the four offensive roles. The defensive roles are the pitcher (P), the catcher (C), the basemen (1B, 2B and 3B), the short stop (SS) and the outfielders to the left (LF), center (CF) and right (RF). The offensive roles are the batter (B) and zero to three runners on bases (R@1, R@2 and R@3).

FIG. 1 shows a diagram of the field with the players located at their average positions. The runners are not shown in the picture for conciseness, but their starting positions are next to the first, second and third bases.

The game of baseball is divided in nine innings, each of which are split into two halves with teams taking turns on attack and defense. In general, a play starts when the pitcher makes the first movement, and finishes when the ball returns to the pitcher's glove or goes out of play. Every player has a fixed initial position, and the set of actions they perform is relatively limited. Players in the offensive role try to touch all four bases in anti-clockwise order (1st, 2nd, 3rd and home plate). Meanwhile, players in the defensive role try to catch the ball and eliminate the attackers, before they are able to save bases and score runs.

Every offensive player starts at the batting position. A pitcher throws the ball at the batter, who then decides if he or she will swing and attempt to hit the ball, or take the pitch and let the catcher catch it. If the batter swings and hits, he or she becomes a runner and will try to save bases, touching each one them in counterclockwise order. Otherwise, if the batter misses, it counts as a "strike." If the batter takes the pitch, the umpire can decide if the ball was valid (went through a strike zone). If it was, the batter receives a "strike." Otherwise, the batter receives a "ball." If a batter receives three strikes, he is "out." If the batter receives four balls, he can "walk" to the first base safely. If the ball is hit and caught in the air by a defensive player, the batter is also "out." If the ball is hit and thrown to first base where it is caught before the batter reaches first base, the batter is also "out."

Having briefly introduced the main features of the game of baseball, example methods for assisting the manual annotation of a baseball play are next described.

§ 5.3 Example Methods for Providing a Manual Tracking System with a "Warm-Start"

Figure 2:
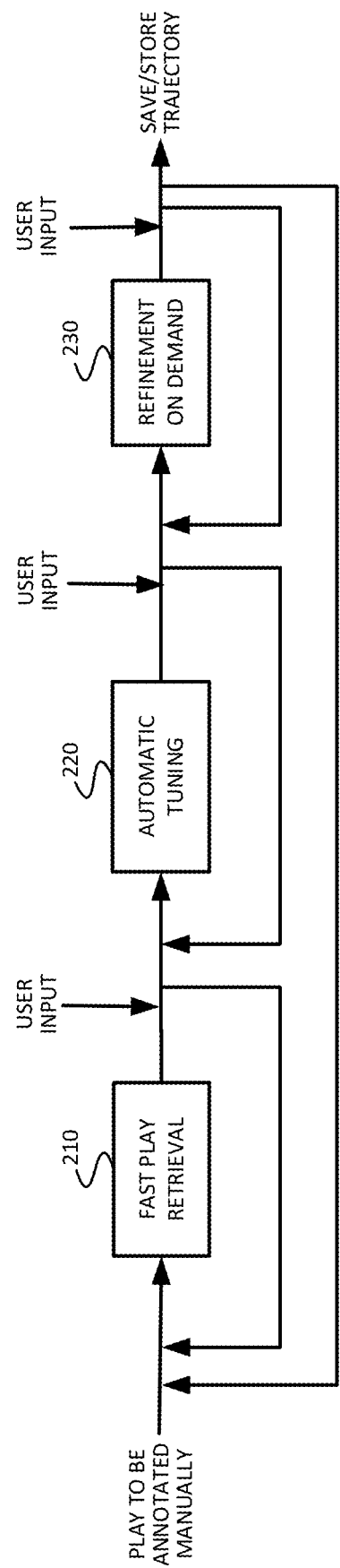
FIG. 2 is a flow diagram of components of an example method, consistent with the present description, for providing assistance for manual play annotation.

This section describes an example methodology to enable quick, single-user, manual tracking of baseball plays by introducing a "warm-starting" step to the annotation process. (Note that the term "warm-start" is borrowed from machine learning, where it means that the model training started from a better initial point.) The example methodology includes up to three steps: (1) fast play retrieval; (2) automatic tuning; and (3) refinement on demand. FIG. 2 illustrates an example flow 200 of these three steps (assuming all are performed). Referring to FIG. 2, a play to be manually annotated is provided as an input (e.g., as a video and/or audio file) to the fast play retrieval step 210. The output of the fast play retrieval step 210 and further user input may be provided as input to the automatic tuning step 220 and/or fed back to the fast play retrieval step 210. The output of the automatic tuning step 220 and further user input may be provided as input to the refinement on demand step 230 and/or fed back to the automatic tuning step 220, and/or fed back (not shown) to the fast play retrieval step 210. Finally, the output of the refinement on demand step 230 and further user input may be provided as an output to save/store the trajectory. Alternatively, the output of the refinement on demand step 230 and further user input may be fed back as input to the refinement on demand step 230, and/or fed back as input (not shown) to the automatic tuning step 220, and/or fed back as input to the fast play retrieval step 210.

Figure 3:
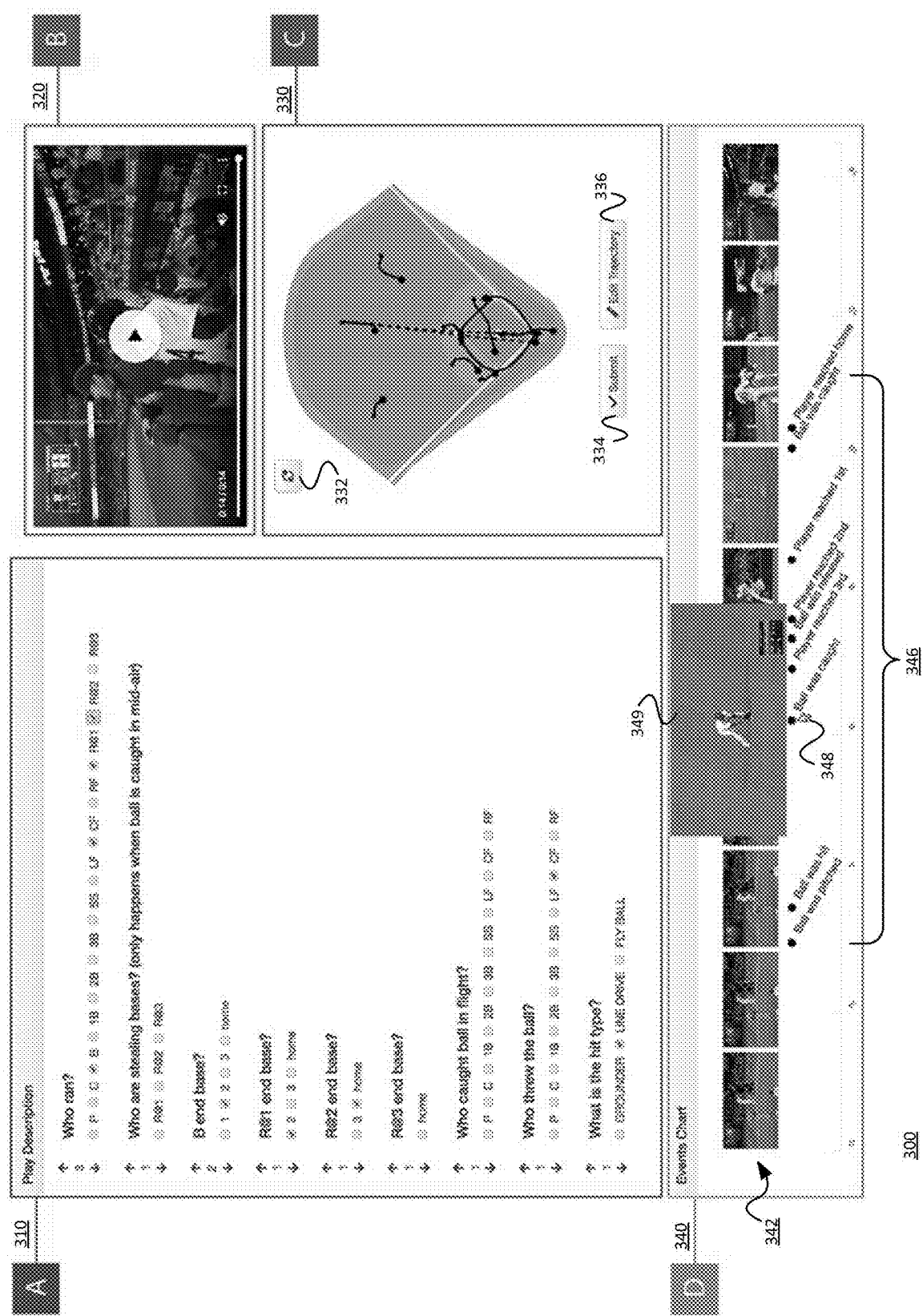
FIG. 3 illustrates an example user interface screen for presenting a set of questions to a user, retrieving a candidate play from the dataset and editing game events.

FIG. 3 illustrates an example user interface screen 300 for providing user input and output in the context of the methodology 200 of FIG. 2 (and in the context of the method 400 of FIG. 4, described later). The example user interface screen 300 includes a play description questions area 310, a play video area 320, a trajectory area 330 and an events chart area 340. Referring to both FIGS. 2 and 3, the fast play retrieval step 210 may be used to present a video of the play of interest to the user in play video area 320 and present the user with one or more questions in play description questions area 310 that they can quickly answer based on the video footage. The information entered by the user into the play description questions area 310 is used to retrieve a collection of similar trajectories from the game corpus dataset. A representative one of the trajectories is presented in the trajectory area 330, and corresponding events 346 are provided in association with various frames 342 of the video of the play to be annotated in the events chart area 340.

Still referring to FIG. 3, the automatic tuning step 220 may be used to allow the user can refine the search by aligning event icons 348 in the events chart area 340 with the events in the video 342 to generate a updated query, including temporal query data (i.e., a query including parts indexed by the event times). The aligned events are used to automatically tune the retrieved trajectory displayed in the trajectory area 330 and make it more similar to the play video to be annotated.

The retrieved trajectory is used to warm-start the manual annotation trajectory displayed in trajectory area 330. If the user selects the edit trajectory button 336 of FIG. 3, the refinement on demand step 230 may be used to allow the user to manually fix the trajectory where it does not match the video of the play being annotated. A user interface screen for this purpose is described later, with reference to FIG. 7.

Figure 4:
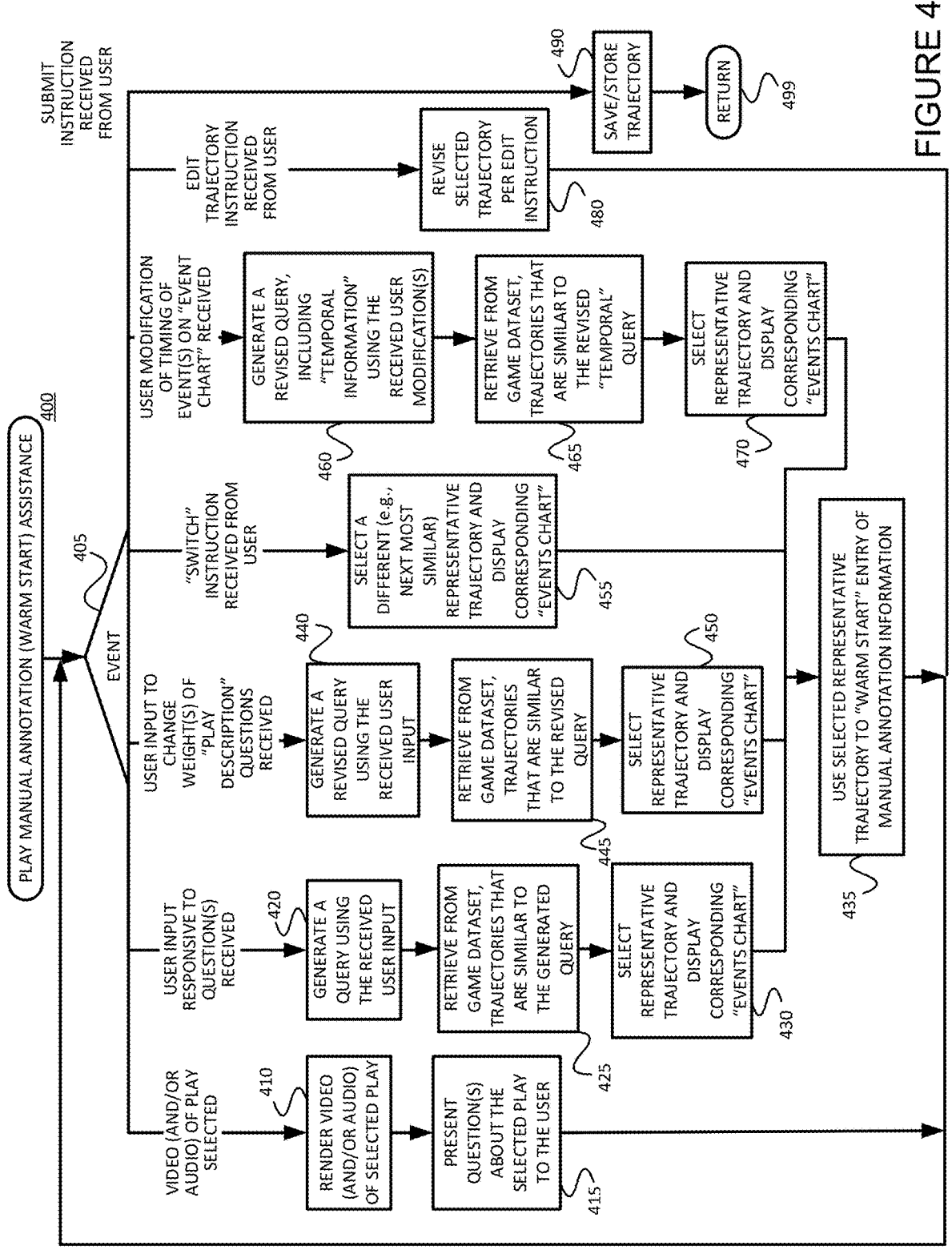
FIG. 4 is a flow diagram of an example method, consistent with the present description, for providing assistance for manual play annotation.

FIG. 4 is a flow diagram of an example method 400, consistent with the present description, for providing assistance for manual play annotation. As shown, different branches of the method 400 may be performed responsive to the occurrence of different events (typically user input). (Event 405) Each of the branches will be described, in order from left to right.

Referring first to the left-most branch responsive to the selection of video (and/or audio) of a play to be manually annotated, the example method 400 renders video and/or audio of the selected play (Block 410)(Recall, e.g., 320 of FIG. 3.) and presents one or more questions about the selected play to the user (Block 415)(Recall, e.g., 310 of FIG. 3.), before returning to event block 405. Next, responsive to the receipt of user input to the question(s), the example method 400 generates a query using the received user input (Block 420), retrieves from a game dataset, a set of one or more trajectories that are similar (e.g., most similar) to the generated query (Block 425), and selects a representative trajectory from the set of one or more trajectories to be displayed with a corresponding events chart (Block 430)(Recall, e.g., 330 and 340 of FIG. 3.), and use the selected representative trajectory to "warm start" entry of manual annotation information (Block 455)(See, e.g., markings on the field in the trajectory area 330 of FIG. 3.) before returning to event block 405. These two branches of the example method 400 may be used to perform the fast play retrieval step 210 of FIG. 2.

Referring back to event block 405, responsive to the receipt of user input to change weight(s) of the (e.g., play description) question(s) received, the example method 400 generates a revised query using the received user input (Block 440), retrieves from a game dataset, a set of one or more trajectories that are similar (e.g., most similar) to the revised query (Block 445), giving preference to the plays that match the questions with higher weights, selects a representative trajectory from the set of one or more trajectories to be displayed with a corresponding events chart (Block 450), and uses the selected representative trajectory to "warm start" entry of manual annotation information (Block 455), before returning to event block 405.

Referring back to event block 405, responsive to the receipt of user input to switch the representative trajectory, the example method 400 selects a different (e.g., next most similar) representative trajectory from the set of one or more trajectories most recently received (Block 455) and uses the different representative trajectory selected to "warm start" entry of manual annotation information (Block 455), before returning to event block 405. Referring back to FIG. 3, a user may enter a switch input via button 332 in the trajectory area 330.

Referring back to event block 405, responsive to the receipt of user input to modify the timing of one or more events on the event chart corresponding to the selected representative trajectory, the example method 400 generates a revised query, including temporal information, using the received user modification input (Block 460), retrieves from a game dataset, a set of one or more trajectories that are similar (e.g., most similar) to the revised temporal query (Block 465), selects a representative trajectory from the set of one or more trajectories to be displayed with a corresponding events chart (Block 470), and uses the selected representative trajectory to "warm start" entry of manual annotation information (Block 455), before returning to event block 405. Referring back to FIG. 3, a user may move one or more of the events 346 to align them with the appropriate one of the frames 342 of the video of the play to be annotated.

The one or more of the three foregoing branches of the example method 300, each of which results in a newly selected representative trajectory, may be used to perform the automatic tuning step 220.

Referring back to event block 405, responsive to the receipt of an instruction for editing the trajectory from the user, the example method 400 may revise the selected trajectory in accordance with the edit instruction received (Block 480) before returning to event block 405. This branch of the example method 400 may be used to perform the refinement on demand step 220. An example user interface screen for allowing the user to manually edit the trajectory is described later with reference to FIG. 7. This user interface screen may be entered, for example, by selecting the edit trajectory button 336 of FIG. 3.

Finally, referring back to event block 405, responsive to the receipt of a submit instruction from the user, the example method 400 may save/store the most recent trajectory (e.g., in association with the originally selected video and/or audio of the play) (Block 490) before the example method 400 is left (Node 499).

§ 5.4 Example Illustrating Operations of an Example Method

Figure 8A:
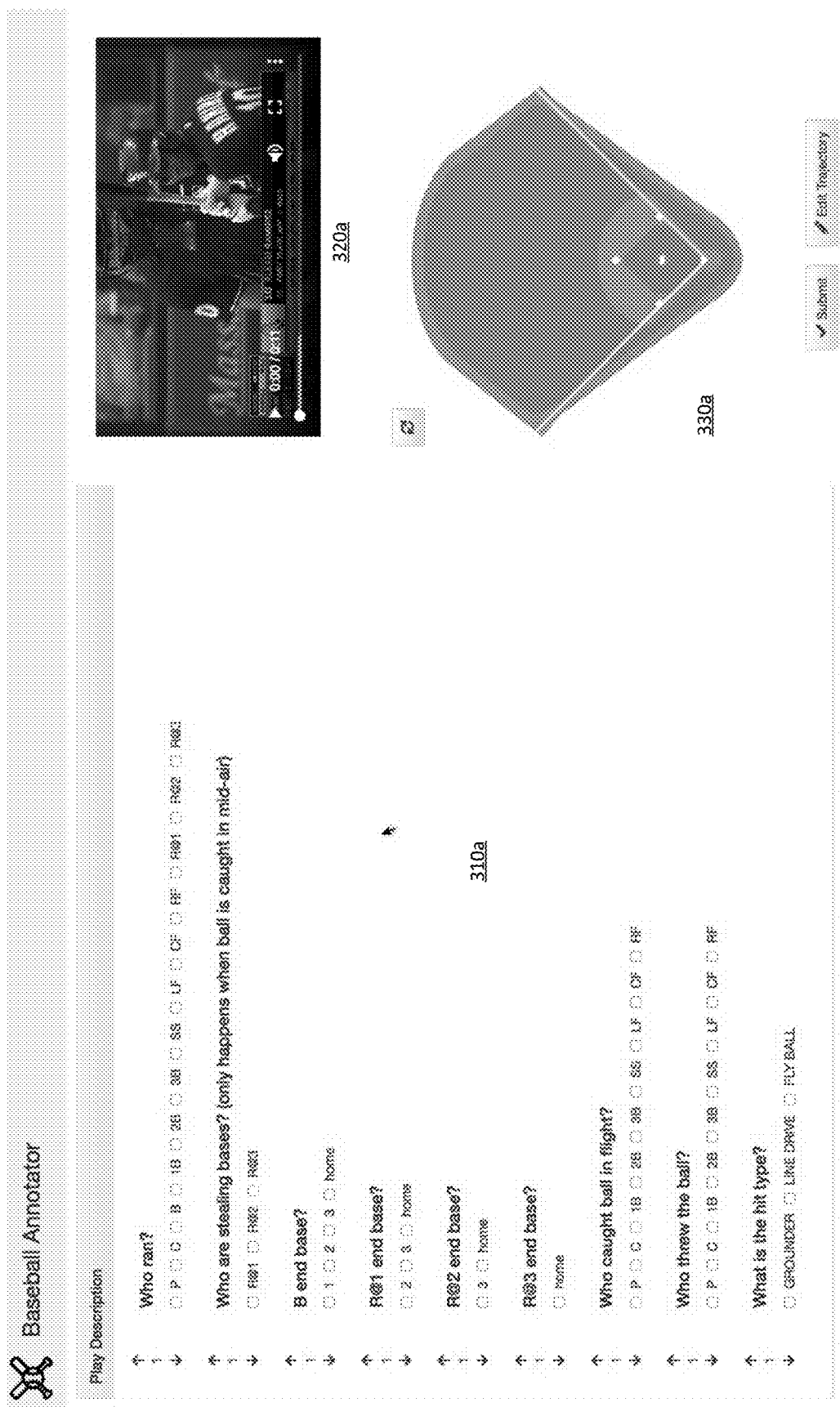

The following example is described in the context of user interface screens 300 and 700, with reference to FIGS. 8A through 8J. FIG. 8A illustrates an initial user interface screen 300a including a play description questions area 310a, a play video area 320a, and a trajectory area 330a. Note that there are no annotations in the initial trajectory area 330a, nor is there an events chart area. This corresponds to the left-most branch in FIG. 4.

Figure 8B:
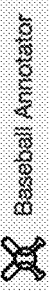

FIG. 8B illustrates a subsequent user interface screen 300b including a play description questions area 310b, a play video area 320b, a trajectory area 330b and an events chart area 340b. Note that the user had provided inputs 312b that the batter (B) and first baseman (1B) ran in the play being annotated. In response, a query is generated from this user input (Recall 420 of FIG. 4.), a search is performed for a similar play (Recall, e.g., 425 of FIG. 4.), a representative play trajectory is used to "warm start" the entry of manual notations in trajectory area 330b (Recall, e.g., 435 of FIG. 4.) and the events chart area 340b is populated with video frames from the play being annotated and event markers from the representative play trajectory (Recall, e.g., 430 of FIG. 4.)

Figure 8C:

FIG. 8C illustrates a subsequent user interface screen 300c including a play description questions area 310c, a play video area 320c, a trajectory area 330c and an events chart area 340c. Note that the user had provided further inputs 312c that the batter's end base was first base and that the second baseman (2B) threw the ball in the play being annotated. In response, a new query is generated from this user input (Recall 420 of FIG. 4.), a search is performed for a similar play (Recall, e.g., 425 of FIG. 4.), a new representative play trajectory is used to "warm start" the entry of manual notations in trajectory area 330c (Recall, e.g., 435 of FIG. 4.) and the events chart area (340c to 340d) is populated with video frames from the play being annotated and event markers from the new representative play trajectory (Recall, e.g., 430 of FIG. 4.) Note that the annotations in the trajectory area 330c have been changed based on the newly retrieved play, as have certain event markers (346c to 346d).

Figure 8D:

FIG. 8D illustrates a subsequent user interface screen 300d including a play description questions area 310d, a play video area 320d, a trajectory area 330d and an events chart area 340d. Note that the user had provided further inputs 312d that the type of hit in the play being annotated is a grounder. In response, a new query is generated from this user input (Recall 420 of FIG. 4.), a search is performed for a similar play (Recall, e.g., 425 of FIG. 4.), a new representative play trajectory is used to "warm start" the entry of manual notations in trajectory area 330d (Recall, e.g., 435 of FIG. 4.) and the events chart area 340d is populated with video frames from the play being annotated and event markers from the new representative play trajectory (Recall, e.g., 430 of FIG. 4.) Note that the annotations in the trajectory area 330d have been changed based on the newly retrieved play, as have certain event markers 346d.

Figure 8G:
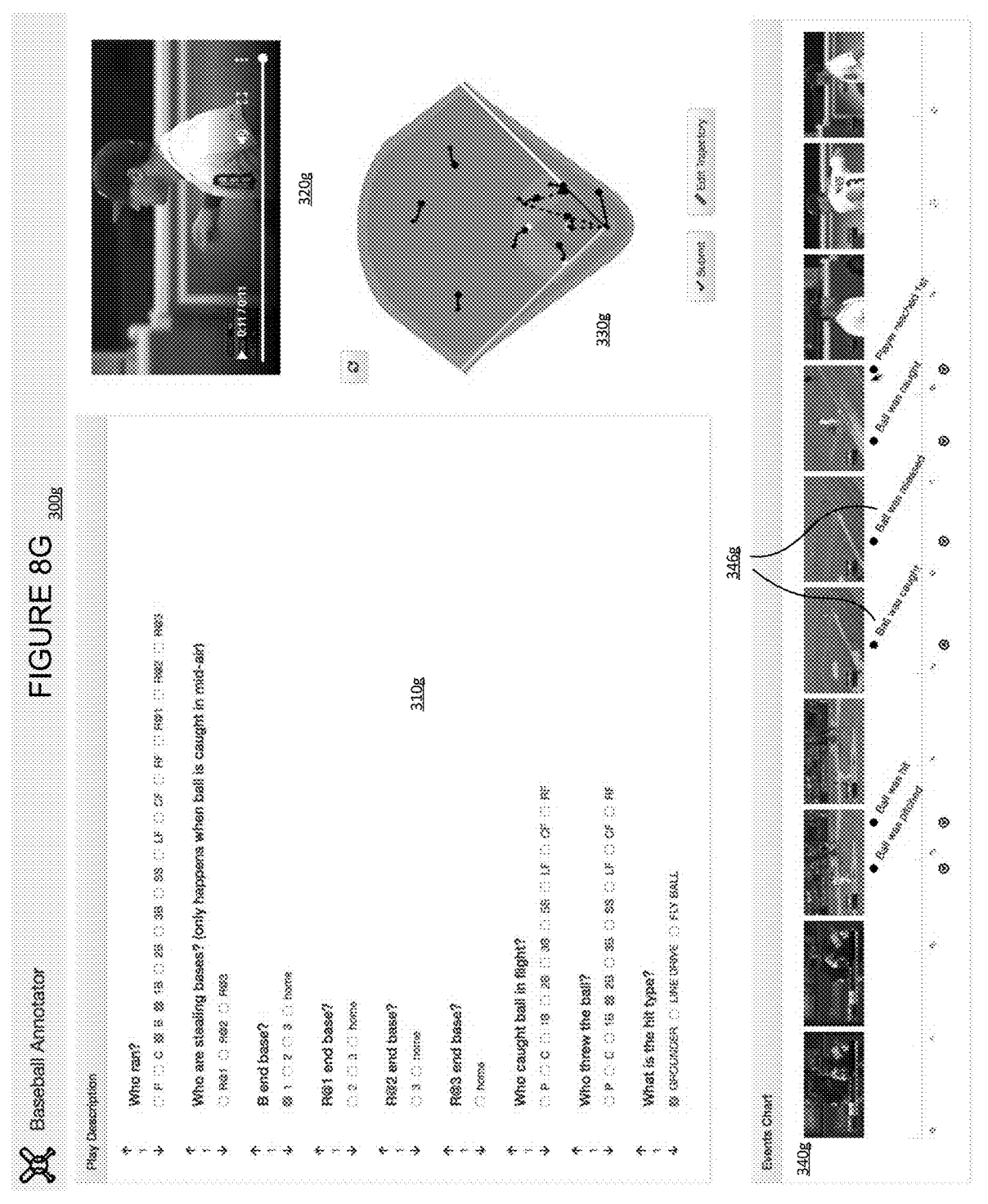

FIG. 8E illustrates a subsequent user interface screen 300e including a play description questions area 310e, a play video area 320e, a trajectory area 330e and an events chart area 340e. Note that the user had manipulated at least one of the event markers to align it with a desired video frame 349e in the video play being annotated. In response, a new query, including temporal information, is generated from this user input (Recall 460 of FIG. 4.), a search is performed for a similar play (Recall, e.g., 465 of FIG. 4.), a representative play trajectory is used to "warm start" the entry of manual notations in trajectory area 330e (Recall, e.g., 435 of FIG. 4.) and the events chart area 340e is populated with video frames from the play being annotated and event markers from the new representative play trajectory (Recall, e.g., 470 of FIG. 4.) Note that the annotations in the trajectory area 330e has been changed based on the newly retrieved play, as have certain event markers. FIG. 8F illustrates a subsequent user interface screen 300f including a play description questions area 310f, a play video area 320f, a trajectory area 330f and an events chart area 340f In this case, an event marker is being further aligned with a specific video frame 349f of the play being annotated. FIG. 8G illustrates a subsequent user interface screen 300g including a play description questions area 310g, a play video area 320g, a trajectory area 330g and an events chart area 340g. In this case, new and/or newly positioned event markers 346g are depicted.

Each of the foregoing FIGS. 8A-8G corresponded to the user interface screen 300 of FIG. 3. Next, suppose the user selected the edit trajectory button 336. This changes the user interface screen to that 700 of FIG. 7. Referring to FIGS. 8H-8J, the example screen user interfaces 700a-700c include four parts: a video playback screen area 710a-710c; a play diagram area 720a-720c in which the user annotates the current player position; a video playback slider area 730a-730c; and a tracking element selector 740a-740c. The user can review the video of the play in area 710a-710c by manipulating the slider 736a-736c. The user can the manually adjust any annotations in the play diagram area 720a-720c. The user can select different elements to track using the drop down menu in tracking element selector area 740a-740c. Once the user is satisfied, they can select the submit button 738a-738c to save the annotations in the play diagram. Otherwise, the user can select the clear trajectory button 739a-739c.

As can be appreciated from the foregoing example, the example method(s) and user interfaces can be used to help a user manually annotate a baseball play by providing warm start information, allowing the user to refine a search to find a more similar play, and by allowing a user to manually edit the annotations in the play diagram.

§ 5.5 Refinements, Alternatives and Extensions

§ 5.5.1 Example Fast Play Retrieval

Referring back to 210 of FIGS. 2 and 410, 415, 420, 425 and 430 of FIG. 4, in order to warm-start the annotation process, an example method consistent with the present description may search a historical trajectory dataset for plays with a "similar structure" as the one being annotated. In one example embodiment, a query based approach similar to (See, e.g., the document, W. Zhou, A. Vellaikal, and C. Kuo, 2000, "Rule-based Video Classification System for Basketball Video Indexing," *Proceedings of the* 2000 *ACM Workshops on Multimedia* (*MULTIMEDIA* '00), ACM, New York, N.Y., USA, 213-216 (incorporated herein by reference).) is used to retrieve the similar plays. However, the query and search are not based on video features, but rather are based on historical tracking data. In one example embodiment, the broadcasting videos used as input are focused on actions, and show only the players (or more generally "actors") that have an impact on the play outcome. In the context of baseball broadcasting, these actions usually include players contouring (i.e., running) bases, throws, catches, tags, etc.

One challenge is to build a mapping from actions that may be identified on videos, to a list of plays. These plays should be similar to the play from which the actions were identified, preferably in terms of both the actions performed and the movements of the players. To implement such a mapping, in one example embodiment, baseball plays are presented by the actions that are performed by the players. In baseball, just like most sports, the tracking data of a play is given as a collection of 2D time series data representing player movement, 3D time series of ball positioning, high-level game events and play metadata. (See, e.g., the document, C. Dietrich, D. Koop, H. T. Vo, and C. T. Silva, 2014, "Baseball4D: A Tool for Baseball Game Reconstruction Amp; Visualization," 2014 *IEEE Conference on Visual Analytics Science and Technology* (*VAST*), 23-32 (incorporated herein by reference) for details.)

Each of the game play "events" may be defined by an {action, player} pair. These {action, player} pairs may be used to refer to specific actions that give context to the tracking data, such as, for example, the moment the ball was pitched, hit, caught, or thrown by a player, etc. By themselves, game events can offer a high level representation of the "play" that is close to what is necessary for building the query. This representation only lacks information about the geometry of the play (trajectories of the targets), which would help to narrow the search down to plays where the targets' movements resembles what is observed in the video. In some example embodiments, an augmented set of events may be used to represent plays, with new events that represent more details of the way the players move on top of the original set of events as illustrated in FIG. 5. More specifically, FIG. 5 illustrates an example of a "play" (left) and the resulting set of "events" (right). The original set of events 510a-510e, shown in gray, is focused on the representation of the interaction between the players and the ball. The representation of plays may be augmented using an augmented set of events 520a-520d, shown in green, which encompass information about both the actions and the movements of the players.

Figure 6:
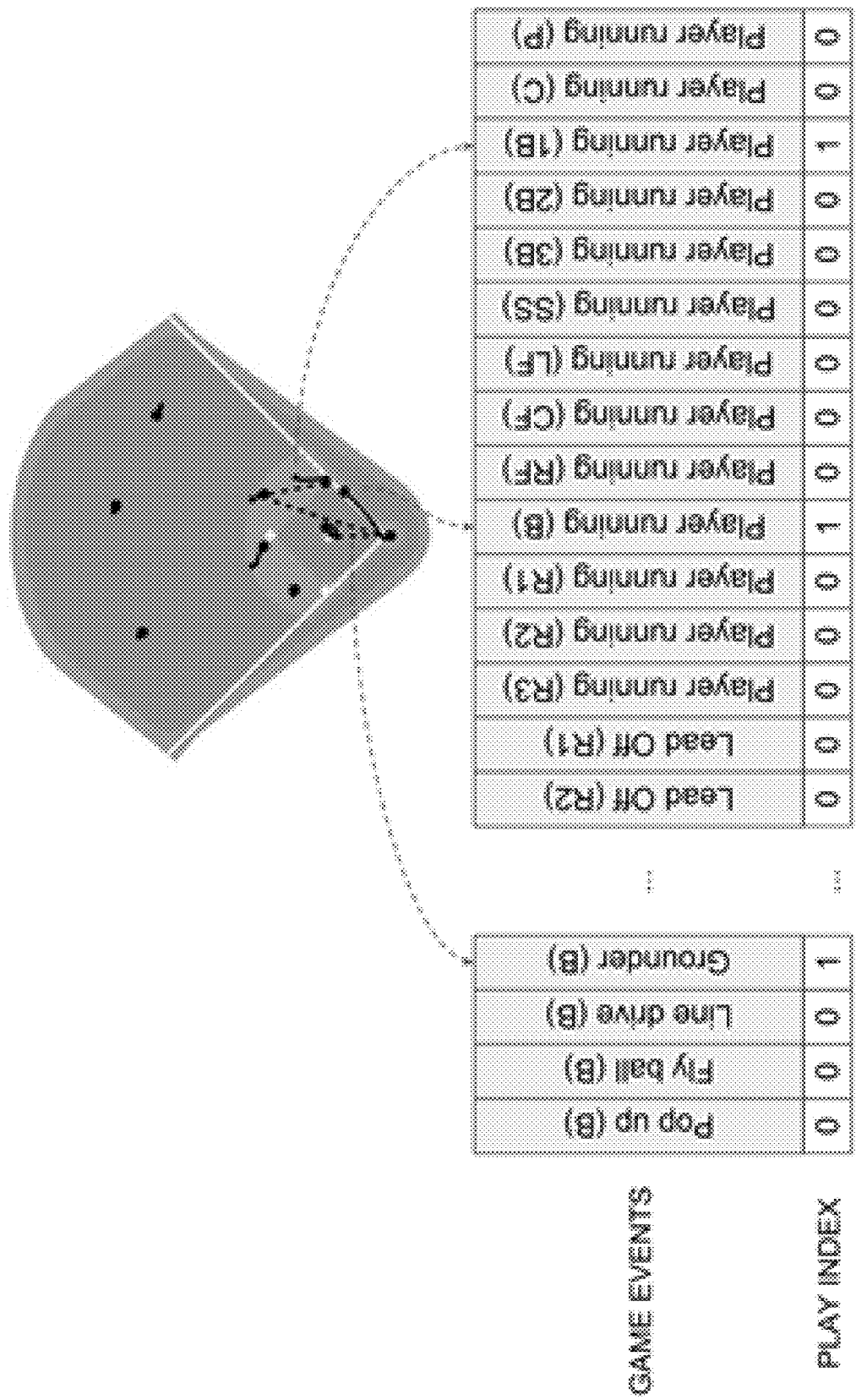
FIG. 6 illustrates how the events of a play can be converted to an index in which each bit is associated to a {event, player} pair.

Once the play representation is defined, at least some example methods may ask the user one or more questions (Recall, e.g., 415 of FIG. 4 and 310 of FIG. 3.) about the events that may be seen on the video. The example method may then build the query using questions that guide the user in the process of looking for the events that would lead to similar plays on the database. For example, a group of questions that effectively summarize baseball plays may include one or more of: (1) Who ran? (2) Who are stealing bases? (3) What are the runners (e.g., batter and any base runners) end bases? (4) Who caught the batted ball in flight? (6) Who threw the ball? and (7) What is the hit type? In one example embodiment, the presentation of the questions is ordered by the impact of each of the questions on the overall trajectory data. Such an embodiment allows a trajectory approximation to be generated as early as possible in the process. This question ordering may be accomplished by first asking questions directly related to the play outcome (i.e., the number of runs in the context of baseball), and then presenting play detail questions later. Referring to FIG. 6, the set of {action, player} events is then converted to a play index where each pair {event, target} (e.g., {action, player}) is associated to with a bit in a bit sequence. The index is then used to retrieve similar plays. One way to determine similarity is described below.

The foregoing approach for query generation and searching (and play representation) results in the clustering of plays by similarity, given by the way the augmented set of events (Recall, e.g., FIG. 5.) was designed. Since the augmented set of events contains information about both the actions and the geometry of the play, each cluster contains plays that are similar in both actions and geometry. The events and the clusters of plays may be designed to accommodate small differences in the play geometry, in a trade-off seeking to decrease the amount of information that will be requested from the user for the query, while seeking to increase the usefulness of the plays returned responsive to the query.

Empirically, the first play returned by the system is a good approximation of the actions and movements observed in the video. If the user chooses to inspect other plays in searching for a better one (Recall, e.g., blocks 440, 455 and 460 of FIG. 4.), the variability among them reduces the number of plays to be inspected.

The user query might result in an index for which there are no "exact" cluster matches in the database. In order to retrieve the "most similar" cluster to the user query, the cluster with the largest number of bits in common with the query should be selected. Some example embodiments also allow the user to increase and/or decrease the importance of some of the questions. (Recall, e.g., blocks 440 and 445 of FIG. 4.) For example, if the user wants to make sure only the selected players ran during the play, they can increase the weight of the question "Who ran?". Let n be the number of questions, Q be the query bits, W be the bits' weights, X be a cluster in the database, and $\mathbb{1}$ be the indicator function, the similarity between Q and X is given by:

$$S = \sum_{i=1}^{n} W_i \times \mathbb{1}(Q_i = X_i).$$

§ 5.5.2 Example Automatic (Trajectory) Tuning

After a description of the play is collected by collecting user answers to one or more questions (Recall 310 of FIG. 3.), a cluster of trajectories is returned that meets (or is most similar to) the query defined by the specified event constraints. (Recall, e.g., 425, 445 and 465 of FIG. 4.) A representative trajectory within this cluster is selected (e.g., randomly) and displayed to the user. (Recall, e.g., 430, 450 and 470 of FIG. 4, as well as 330 of FIG. 3.)

If the user feels that the displayed representative trajectory does not represent the play correctly, in some example embodiments, the user may: (1) change the weight(s) of at least some of the question(s) in the play description (Recall, e.g., 310 of FIG. 3.) in order to retrieve a better cluster for the play (Recall, e.g., 440, 445 and 450 of FIG. 4.); (2) enter a switch trajectory instruction (Recall, e.g., button 332 at the top left corner of 330 in FIG. 3.) to select another (e.g., random) representative trajectory from the cluster (Recall, e.g., 455 of FIG. 4.); and/or (3) modify the timing of one or more event icons in the events chart (Recall, e.g., 340 of FIG. 3.) to query this cluster based on the time(s) of one or more event(s) (Recall, e.g., 460, 465 and 470 of FIG. 4.).

Referring back to FIG. 3, in the events chart area 340 of the display 300 displays frames of the play corresponding to the input video, the main play events 346 are displayed. To help align the events of the trajectory data with those in the video 342, an example embodiment may use the sound of the baseball hit in the video. More specifically, if the video contains a batting event (bat hits ball), the precise moment of the batting event can be detected in the corresponding audio signal, and this information can be used to align the event data with the video content. This may be done by treating the problem as an audio onset detection problem under the assumption that the batting event corresponds to the strongest onset (impulsive sound) in the audio signal. For example, the superflux algorithm for onset detection (See, e.g., the document, S. Bock and G. Widmer, 2013, "Maximum Filter Vibrato Suppression for Onset Detection," *Proc. of the* 16*th Int. Conf. on Digital Audio Effects* (*DAFx*), Maynooth, Ireland (September 2013). 7 (incorporated herein by reference).) as implemented in the librosa audio processing library (See, e.g., the document, B. McFee, C. Raffel, D. Liang, D. Ellis, M. McVicar, E. Battenberg, and O. Nieto, 2015, "librosa: Audio and Music Signal Analysis in Python," *Proceedings of the* 14*th python in science conference,* 8 (incorporated herein by reference).) may be used to compute an onset strength envelope representing the strength of onsets in the signal at every moment in time. In one embodiment, the analysis uses a window size of 512 samples and a hop size of 256 samples, where the sampling rate of the audio signal is 44,100 Hz, leaving all other parameters at their default values. (This approach was evaluated by manually annotating a validation set of 311 audio recordings with the timestamp of the batting event, and comparing the output of the detection method to the annotations, where the output is considered to be correct if it is within 100 ms of the annotated value. Applying the approach, the audio recordings achieved an accuracy of 94.5%, which is sufficient for the intended purpose.) Naturally, other ways of detecting the batting event may be used instead, or in addition. If the video does not have a batting event, the user may align the events manually.

Still referring to FIG. 3, the user can drag and drop game events 346 across the time axis and query for a play with event(s) having time(s) that best match the event(s) and their time(s) corresponding to the user input. In some example embodiments, once the user starts dragging an event along the timeline, an image with the current video frame 349 will be positioned over the user's mouse, thereby enabling the user to identify exactly when a particular event happened in the play. For example, if the user wants to specify the time at which the ball was caught and use this event time to search for a play with a close (or closest) event time in the cluster, the user may drag the event icon "Ball was Caught" in the events chart area 340 so that it aligns with the player action in the video 342.

One example embodiment may automatically adapt the retrieved trajectory so that it respects the event "Ball was pitched" in the events chart area 340. To do so, the retrieved trajectory is shifted so that the pitched event matches the one specified in the events chart area 340. This action is a simple trajectory preprocessing step, but it allows the method to quickly align the begin-of-play on the retrieved trajectory with the begin-of-play in the video.

By querying the cluster with the time and event information in the events chart area 340, the user can obtain a better initial trajectory from which their annotations are warm-started. (Recall, e.g., 470 and 435 of FIG. 4.) As described in more detail in § 5.4.3 below, after this step is completed, the user can click the "Edit Trajectory" button 336 and manually change the positions of players and/or the ball to better reflect the elements in the video. In any event, once the user is satisfied that the retrieved (and possibly edited) trajectory matches the play in the input video, they can click the submit button 334 to save the new trajectory. (Recall, e.g., 490 of FIG. 4.)

As should be appreciated from the foregoing, if the user changes any of the answers, or the weights for the answers, the query is re-run. If the user changes any of the event times, the new event times are used to pick a better trajectory from the already retrieved cluster.

§ 5.5.3 Refinement on Demand: Manual Annotation

Figure 7:
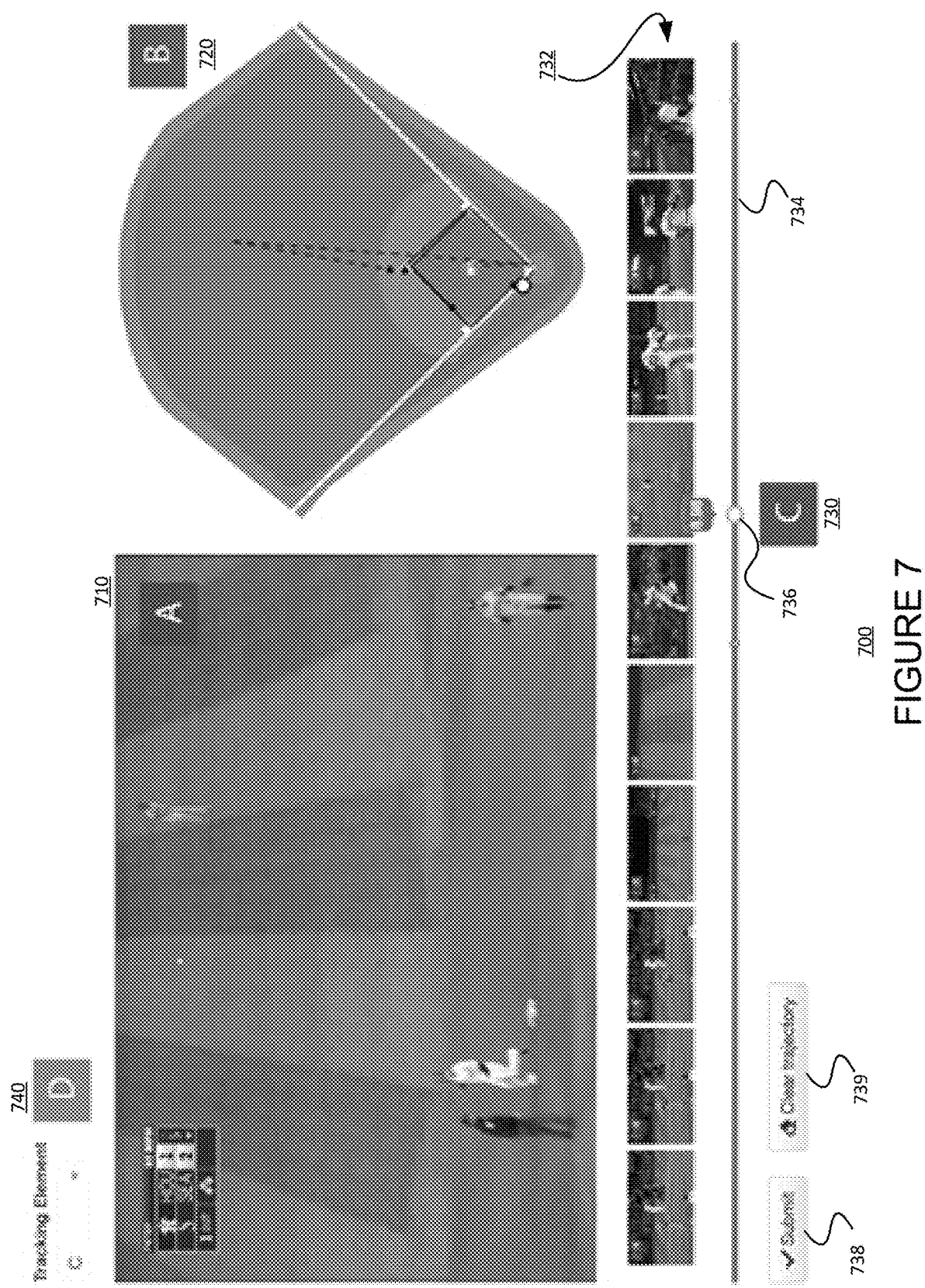
FIG. 7 illustrates an example display screen for use in manual tracking system. The example display screen includes a video playback screen, a play diagram for position input, a video playback slider and a tracking element selector.
Figure 8H:
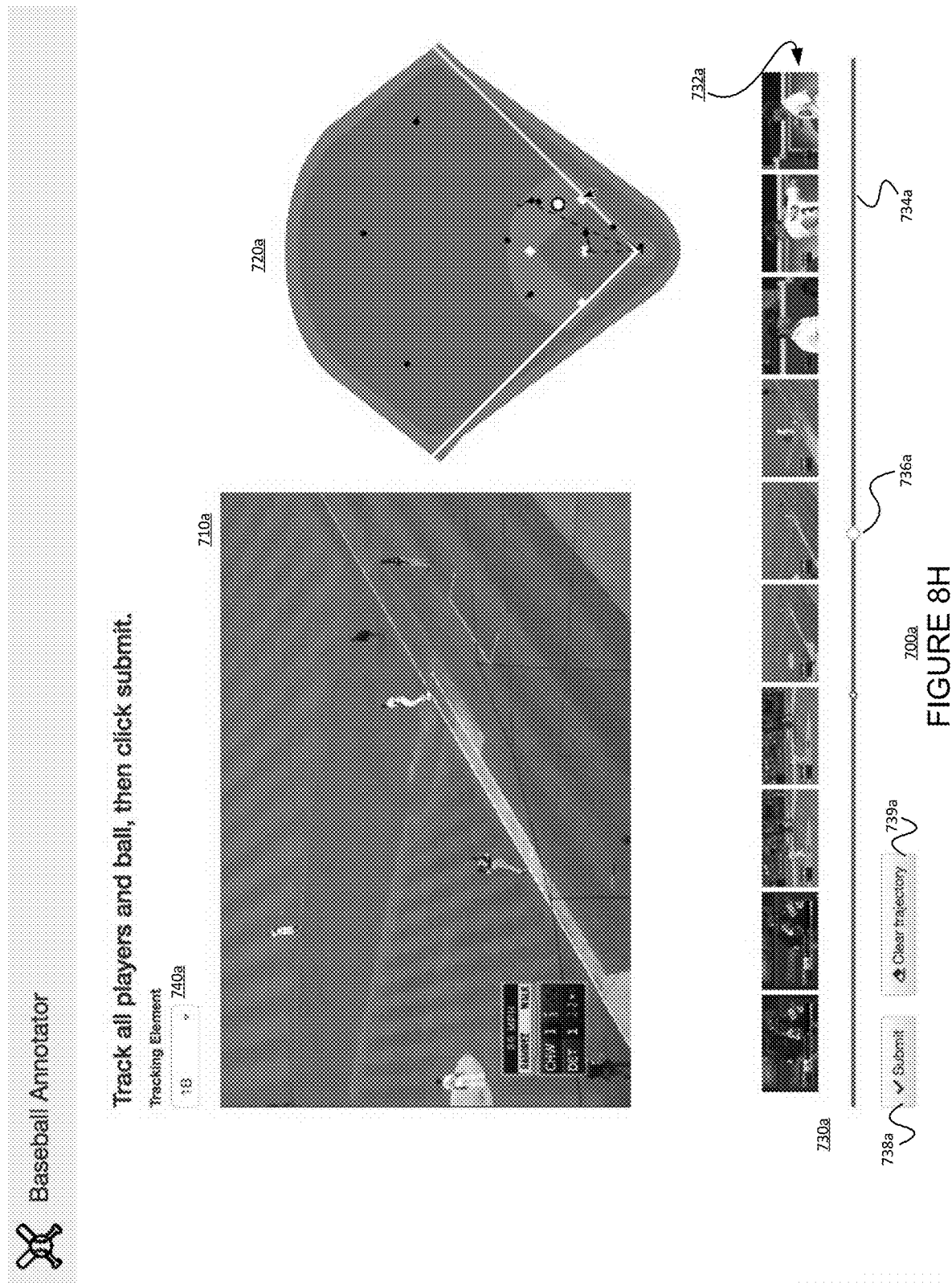
Figure 8I:
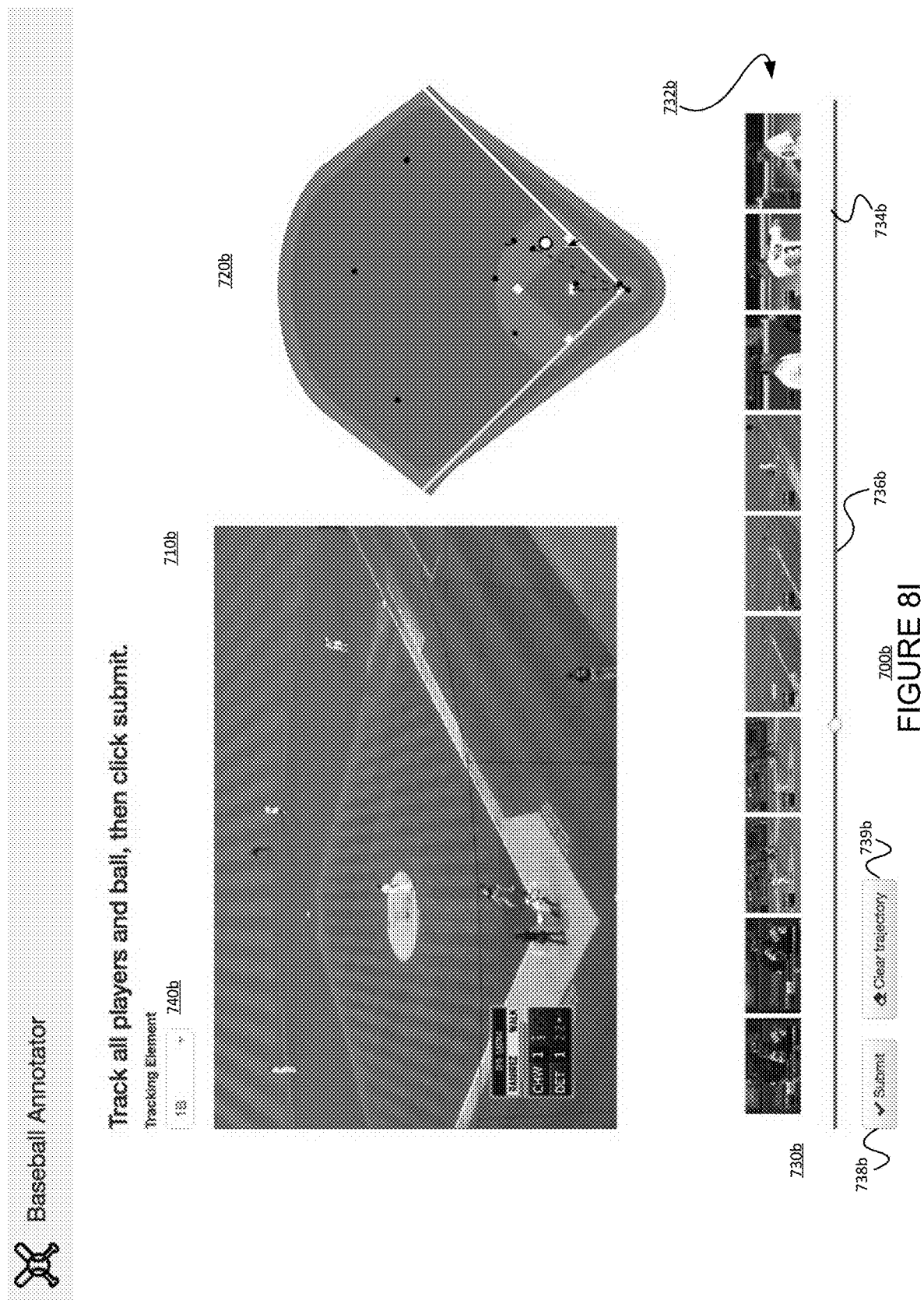
Figure 8J:
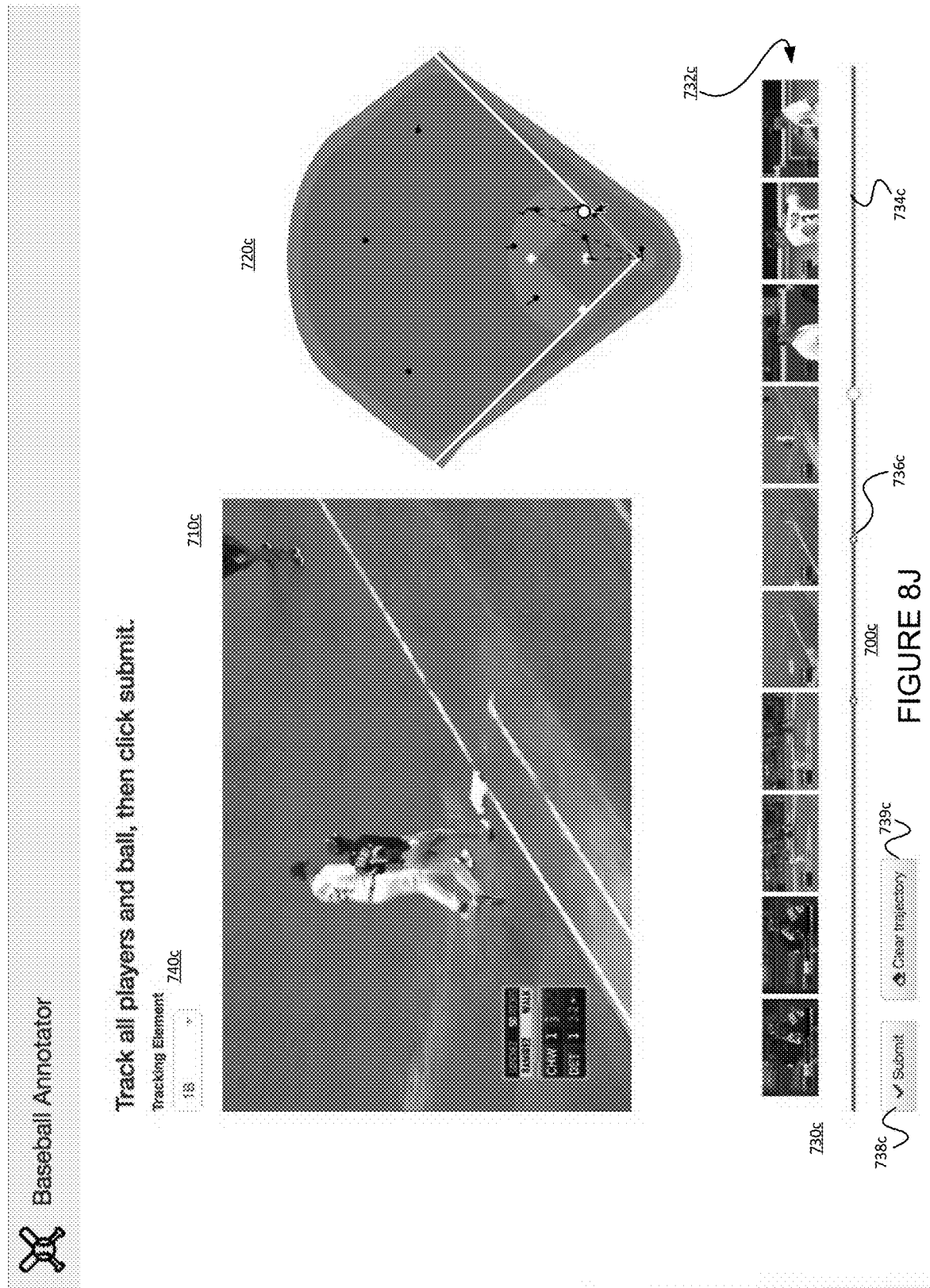

FIG. 7 is an example screen user interface 700 for allowing the user to edit and refine the previously recommended trajectories. (Recall, e.g., 480 of FIG. 4.) The example screen user interface 700 includes four parts: a video playback screen area 710; a play diagram area 720 in which the user annotates the current player position; a video playback slider area 730; and a tracking element selector 740.

The example trajectory annotation process is straightforward. The user positions the video 732 at a frame of interest (keyframe) 710 using the playback slider 734/736, and marks the player position in the field by selecting the same position in the play diagram 720. Consecutive keyframes may be linearly interpolated to generate the tracking data. After the annotation of a player and/or ball is completed, the user can annotate the next player by selecting it in the tracking element selector 740.

If the user determines that the warm-start trajectory for an element is wrong, they can click on a "Clear Trajectory" button 730 to delete the keyframes from the current element trajectory and start the annotation again. Once the user is satisfied with the trajectory, the user can submit it via button 738.

§ 5.5.5 Multicamera Annotation

Figure 9A:
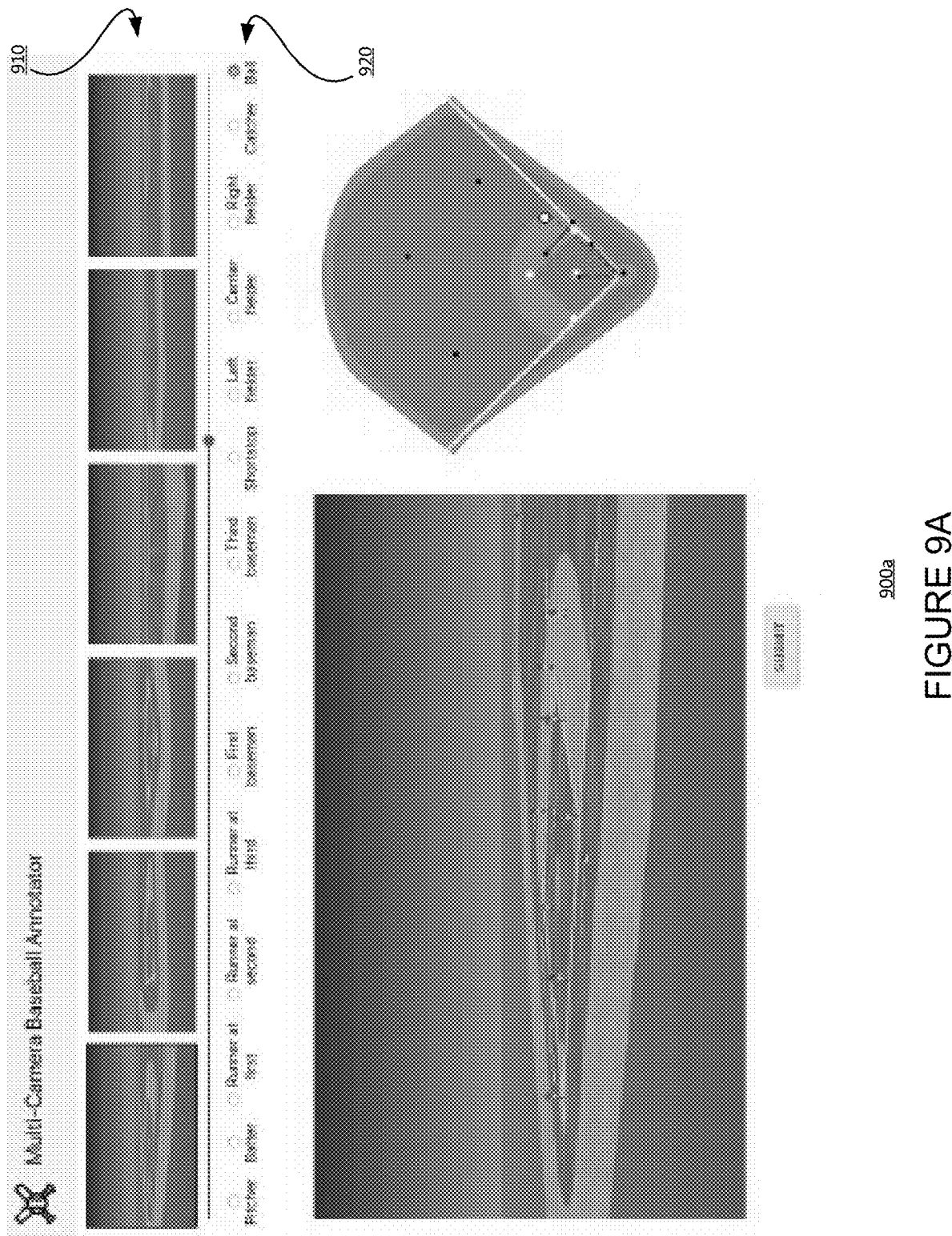
FIGS. 9A and 9B illustrate an example multi-camera interface screen which may be used in a manner consistent with the present description.
Figure 9B:
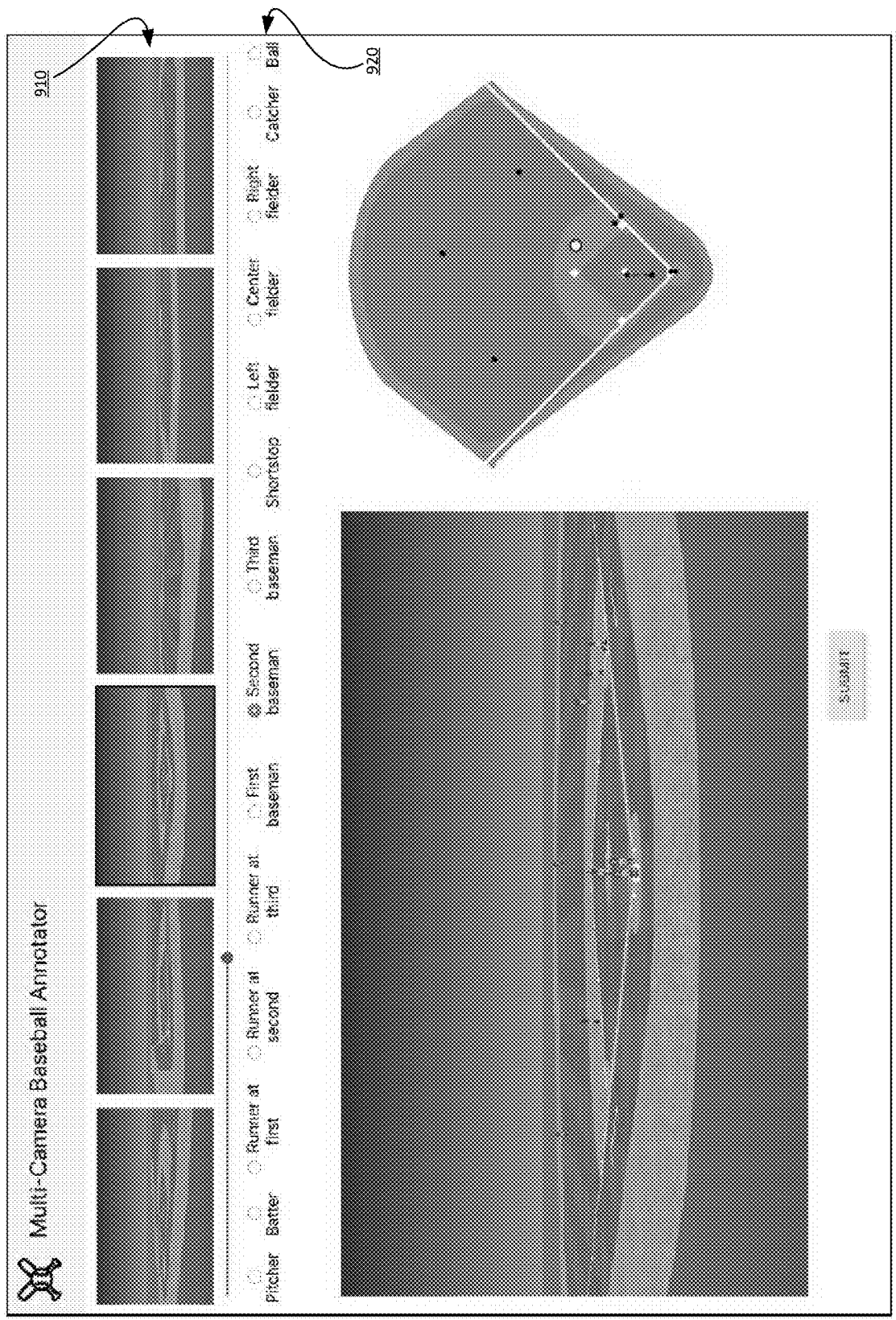

FIGS. 9A and 9B illustrate an example multi-camera interface screen 900*a*/900*b* which may be used in a manner consistent with the present description. The example baseball manual tracking system may be modified to support multiple cameras. Multi-Camera Multi-Object tracking is a technology that has been used in a wide array of applications, including street monitoring and security, self-driving cars and sports analytics. In the context of manual trajectory annotation, using multiple videos improves the accuracy of annotators because it allows them to choose cameras that offer a better viewing angle for the element being tracked.

The user interface screen display 910*a*/910*b* of FIGS. 9A and 9B may be used in a system which supports up to six videos 910 that are synchronized using the hit sound and displayed side by side to the user. While annotating a game, the user can click on a video to expand at the bottom of the screen. FIG. 9A shows the annotation of the "Ball" element 920, with a camera positioned behind first base. Notice that because the ball is closer to first base, this camera position makes the annotation process easier. FIG. 9B shows the annotation of the second baseman 920 with a camera positioned behind the home plate. Because this viewing angle allows the user to see all the bases, the user has a context with which to position the baseman on the field.

§ 5.5.6 Further Alternatives and Extensions

Although the foregoing methods were described in the context of the sport of baseball, the method is not limited to a specific sport. For example, it can be applied to other sports such as football, basketball, hockey, soccer, lacrosse, field hockey, volleyball, water polo, golf, etc. Such sports have well-understood fields, player positions, plays, etc. It can also be applied to sports with "sequences" of interest (e.g., points, lead changes, etc.) rather than well-defined plays (e.g., fencing, golfing, running, rowing, diving, tennis, racquetball, squash, handball, wrestling, gymnastics, boxing, fighting, etc.).

The foregoing methods are not limited to balls, and may include sports using other "actors" such as, for example, other projectiles (e.g., pucks, Frisbees, etc.). Indeed, the foregoing methods can be used in any context in which a "sequence" including "events" (which might be defined as {action, actor} pairs), rather than a "play" including "events" (which might be defined as {action, player} or {action, projectile} pairs), is to be annotated manually.

Extending the example methods, systems and user interfaces for use with other sports, such as soccer and basketball, is straightforward. One only needs a set of events to describe plays and some historical tracking data.

The warm-starting procedure can be extended to non-sports domains as well. For example, historical information can be used to help annotate semantic image segmentation datasets. (See, e.g., the document, Alexander Klaser, 2010, "LEAR—Image Annotation Tool," https://lear.inrialpes.fr/people/klaeser/software_image_annotation (incorporated herein by reference).) Pixel-wise image annotation is a time consuming task, so it would greatly benefit from warm-starting.

Furthermore, the example methods, systems and user interfaces can be extended, for example, for annotating historical video collections, which may then be potentially used for generating statistics for comparing how players performance changes over time, or to enable parents the parents or coaches of young athletes to track player performance as the players mature.

As another example, the example methods, systems and user interfaces can be extended for use as a crowdsourcing tool that could potentially be used during live events by integrating the inputs of multiple people.

The present invention is not limited to the example embodiments described above, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

§ 5.6 Example Apparatus

As understood by those having ordinary skill in the art, as used in this application, "section," "unit," "component," "element," "module," "device," "member," "mechanism," "apparatus," "machine," or "system" may be implemented as circuitry, such as integrated circuits, application specific circuits ("ASICs"), a field programmable gate arrays ("FPGAs"), field programmable logic arrays ("FPLAs"), etc., and/or software implemented on one or more processors, such as a microprocessor(s). For example, apparatus for performing any of the methods consistent with the present description may include at least one of (A) a processor executing stored program instructions, (B) an ASIC, (C) an FPGA, and/or (D) a FPLA. A tangible computer-readable storage medium may be used to store instructions, which, when executed by at least one processor, perform any of the foregoing methods. Such methods may be implemented on a local computer (e.g., PC and/or laptop), and/or one or more remote computers (e.g., server(s)). If implemented on more than one computer, such computers may be interconnected via one or more networks (e.g., the Internet, a local area network, etc.). Such computer(s) may include one or more devices to receive user input (e.g., keyboard, mouse, trackpad, touch panel, microphone, etc.) and one or more devices to present information to users (e.g., displays, speakers, etc.).

Figure 10:
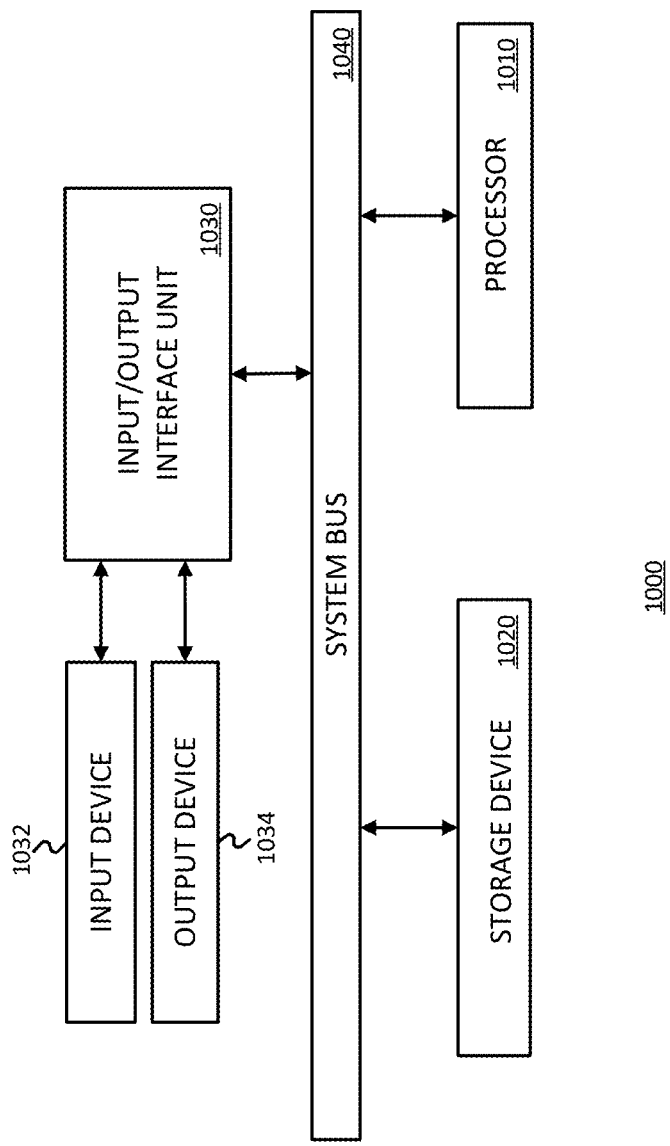
FIG. 10 illustrates an example apparatus on which example methods consistent with the present description may be performed.

FIG. 10 is a block diagram of an exemplary machine 1000 that may perform one or more of the method(s) described, and/or store information used and/or generated by such methods. The exemplary machine 1000 includes one or more processors 1010, one or more input/output interface units 1030, one or more storage devices 1020, and one or more system buses and/or networks 1040 for facilitating the communication of information among the coupled elements. One or more input devices 1032 and one or more output devices 1034 may be coupled with the one or more input/output interfaces 1030. The one or more processors 1010 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 1020 and/or may be received from an external source via one or more input interface units 1030. The machine executable instructions may be stored as various software modules, each module performing one or more operations. Functional software modules are examples of components, which may be used in the apparatus described.

In some embodiments consistent with the present disclosure, the processors 1010 may be one or more microprocessors and/or ASICs. The bus 1040 may include a system bus. The storage devices 1020 may include system memory, such as read only memory (ROM) and/or random access memory (RAM). The storage devices 1020 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program, which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, etc. Alternatively, or in addition, embodiments consistent with the present disclosure (or components or modules thereof) might be implemented as stored program instructions executed by a processor. Such hardware and/or software might be provided in a server, a laptop computer, desktop computer, a tablet computer, a mobile phone, or any device that has computing capabilities.

§ 5.7 Evaluation

An example annotation methodology consistent with the present description was compared to "baseline" manual tracking with no warm-start in the '279 provisional, which has already been incorporated herein by reference. Ten plays were selected for the evaluation. Details regarding analyzing the tracking results with respect to the tracking error and the annotation time, a qualitative analysis of the system and user feedback are all provided in the '279 provisional.

§ 5.8 Conclusions

The described methodologies aid in the manual tracking of baseball plays (or any other sequence of events) by reducing the annotation burden. By providing "warm start" information from a few quick user inputs, manual annotation is made more enjoyable to users than manual annotation from scratch. It also reduces the time needed to produce reliable tracking data. By warm-starting the annotation process, instead of annotating trajectories on an empty canvas (e.g., field diagram), users find a similar play, with an existing trajectory, and then modify the existing trajectories to reflect the play they want to annotate. More specifically, the described methods quickly collect a summary of the play by asking the user a few easy-to-answer questions. These answers are used to recommend a set of similar plays that have already been tracked and can be used as an initial approximation.

The example methods advantageously produce reliable annotations at a lower cost to existing systems, and can be used to annotate historical plays that would be otherwise lost for quantitative analysis.

User studies demonstrated that warm-starting the annotation of baseball plays reduces the time needed to generate the hand-annotated tracking data and has an equivalent performance to manually annotating plays from scratch.

The example methods described advantageously use knowledge already acquired to lower the cost of future data acquisition. Such example methods are able to take broadcast video from baseball games and generate high-quality tracking data, with a much lower level of user input that starting from scratch. Many of the tedious tasks are automated by leveraging information retrieval techniques on a corpus of previously acquired tracking data. The described methods and embodiments are not limited to baseball; they can be extended for use in other domains.

What is claimed is:

1. A computer-implemented method for helping a user to annotate a play of a sporting game to provide data describing the play, the computer-implemented method comprising:

a) selecting, via a user input device, video and/or audio of a sequence of events of the play to be manually annotated by a user;
    b) providing, for presentation in a user interface, at least one question about content of the sequence of events of the play;
    c) receiving, by at least one processor, information describing at least one event of the sequence of events of the play as at least one answer from the user in response to the at least one question about the content of the sequence of events of the play;
    d) retrieving, by at least one of the at least one processor, using the received information describing at least one event of the sequence of events of the play, a set of at least one candidate sequence of a previously annotated play of the sporting game that has data describing the previously annotated play that is similar to the received information describing the at least one event of the sequence of events of the play from a corpus dataset of previously annotated plays of the sporting game;
    e) selecting, automatically by at least one of the at least one processor, one of the at least one candidate sequence of the previously annotated plays of the sporting game of the retrieved set as a representative play sequence;
    f) populating, by at least one of the at least one processor, fields of a manual annotation user interface screen of the user interface for the sequence of events of the play with information based on the data describing the representative play sequence; and
    g) annotating the sequence of events of the play using (i) the information based on the data describing the representative play sequence populating the fields of the manual annotation interface, and/or (ii) data manually input to edit the populated fields of the manual annotation interface.

2. The computer-implemented method of claim 1, wherein the video and/or audio of a sequence of events of the play includes a video of the sequence of events of the play, the computer-implemented method further comprising:

h) receiving manual user input to edit the populated fields of the manual annotation user interface screen for the sequence of events of the play where it does not match the video of the sequence of events of the play.

3. The computer-implemented method of claim 1 further comprising:

h) receiving manual user input to revise information describing at least one event of the sequence of events of the play from the user;
    i) retrieving, by at least one of the at least one processor, using the received revised information describing at least one event of the sequence of events of the play, a new set of at least one candidate sequence of a previously annotated play of the sporting game that has data describing the previously annotated play that is similar to the received revised information describing the at least one event of the sequence of events of the play from the corpus dataset of previously annotated plays of the sporting game;
    j) selecting, automatically by at least one of the at least one processor, one of the at least one candidate sequence of the previously annotated plays of the sporting game of the retrieved new set as a new representative play sequence; and
    k) re-populating, by at least one of the at least one processor, fields of the manual annotation user interface screen of the user interface for the sequence of events of the play with information based on the data describing the new representative play sequence.

4. The computer-implemented method of claim 1 wherein the at least one question provided for presentation to the user is a set of questions that are ordered by their overall impact on narrowing the set of at least one candidate sequence retrieved from the corpus dataset of previously annotated plays of the sporting game.

5. The computer-implemented method of claim 4 wherein the sequence of events of the play is a baseball play, and wherein the set of questions includes at least two of (1) who ran, (2) who are stealing bases, (3) what are end bases of runners, (4) who caught the batted ball in flight, (5) who threw the ball, and (6) what is the hit type.

6. The computer-implemented method of claim 4 wherein the sequence of events of the play is a sports play, and wherein the set of questions is ordered such that questions directly related to an outcome of the sports play are asked before questions about details of the sports play.

7. The computer-implemented method of claim 1 wherein each event of the sequence of events of the play is represented by at least one {action, actor} pair of data.

8. The computer-implemented method of claim 7 wherein the actor is one of (A) a sports player position, (B) a sports player name, (C) a sports player type, (D) a ball, (E) a puck, and (F) a projectile.

9. The computer-implemented method of claim 1 wherein each event of the sequence of events of the play has a time stamp measuring a time relative to a starting point.

10. The computer-implemented method of claim 1 wherein the representative play sequence is presented, via the user interface, to the user and includes an events chart including (1) frames of video of the play to be manually annotated by the user and (2) at least one event marker on a timeline of the play, each of the at least one event marker being associated with at least one of the frames of video.

11. The computer-implemented method of claim 10 wherein the at least one event marker is a temporal sequence of event markers of the events chart that are aligned using a start marker, wherein the start marker is determined from at least one of (A) a predetermined distinctive sound in the video and/or audio of the sequence of events of the play, (B) a predetermined distinctive sound sequence in the video and/or audio of the sequence of events of the play, (C) a predetermined distinctive image in the video and/or audio of the sequence of events of the play, (D) a predetermined distinctive image sequence in the video and/or audio of the sequence of events of the play, and (E) a manually entered demarcation and/or audio of the sequence of events of the play.

12. The computer-implemented method of claim 10 further comprising:
  h) receiving a user input manipulating an event marker included in the events chart to change a frame of video of the events chart with which the event marker manipulated by the user input receive is associated;
  i) performing a temporal query to retrieve, by at least one of the at least one processor, using the received user input for manipulating the event marker, a new set of at least one candidate sequence of a previously annotated play of the sporting game that has data describing the previously annotated play that is similar to the received revised information describing the at least one event of the sequence of events of the play from the corpus dataset of previously annotated plays of the sporting game;
  j) selecting, automatically by at least one of the at least one processor, one of the at least one candidate sequence of the previously annotated plays of the sporting game of the retrieved new set to the user as a new representative play sequence; and
  k) re-populating, by at least one of the at least one processor, using the new representative play sequence to re-prepopulate fields of the manual annotation user interface screen of the user interface for the sequence of events of the play with information based on the data describing the new representative play sequence.

13. The computer-implemented method of claim 1 wherein each sequence of events of the play is represented as a bit sequence indexing different events, and wherein the set of at least one candidate play belongs to a cluster of plays, each play including a sequence of events of the play represented as a bit sequence indexing different events, with the largest number of bits of the bit sequence in common with the bit sequence of the query.

14. The computer-implemented method of claim 1 wherein the events of the sequence of events of the play are weighted by the user in order to allow the user to increase or decrease the importance of certain events used to retrieve, using the received information defining the at least one event of the sequence of events of the play, a set of at least one candidate sequence of events of the play from the corpus dataset.

15. The computer-implemented method of claim 1 wherein the representation of a selected one of the at least one candidate sequence of the retrieved set includes a timeline of the selected sequence.

16. The computer-implemented method of claim 1 wherein the sequence of events of the play is a sports play, and wherein the representation of a selected one of the at least one candidate sequence of the retrieved set includes a plan view of a field of play, the plan view including trajectories of events associated with the selected play.

17. Apparatus comprising:
  a) at least one processor; and
  b) a non-transitory computer readable medium storing instructions which, when executed by the at least one processor, cause the at least one processor to perform a method including
    1) Selecting, via a user input device, video and/or audio of a sequence of events of the play to be manually annotated by a user;
    2) Providing, for presentation in a user interface, at least one question about content of the sequence of events of the play;
    3) Receiving, by at least one processor, information describing at least one event of the sequence of events of the play as at least one answer from the user in response to the at least one question about the content of the sequence of events of the play;
    4) retrieving, by at least one of the at least one processor, using the received information describing at least one event of the sequence of events of the play, a set of at least one candidate sequence of a previously annotated play of the sporting game that has data describing the previously annotated play that is similar to the received information describing the at least one event of the sequence of events of the play from a corpus dataset of previously annotated plays of the sporting game;
    5) Selecting, automatically by at least one of the at least one processor, one of the at least one candidate sequence of the previously annotated plays of the sporting game of the retrieved set as a representative play sequence;

6) Populating, by at least one of the at least one processor, fields of a manual annotation user interface screen of the user interface for the sequence of events of the play with information based on the data describing the representative play sequence; and 7) Annotating the sequence of events of the play using (i) the information based on the data describing the representative play sequence populating the fields of the manual annotation interface, and/or (ii) data manually input to edit the populated fields of the manual annotation interface.

18. A non-transitory computer readable medium storing instructions which, when executed by at least one processor, cause the at least one processor to perform a method comprising:

a) selecting, via a user input device, video and/or audio of a sequence of events of the play to be manually annotated by a user;

b) providing, for presentation in a user interface, at least one question about content of the sequence of events of the play;

c) receiving, by at least one processor, information describing at least one event of the sequence of events of the play as at least one answer from the user in response to the at least one question about the content of the sequence of events of the play;

d) retrieving, by at least one of the at least one processor, using the received information describing at least one event of the sequence of events of the play, a set of at least one candidate sequence of a previously annotated play of the sporting game that has data describing the previously annotated play that is similar to the received information describing the at least one event of the sequence of events of the play from a corpus dataset of previously annotated plays of the sporting game;

e) selecting, automatically by at least one of the at least one processor, one of the at least one candidate sequence of the previously annotated plays of the sporting game of the retrieved set as a representative play sequence;

f) populating, by at least one of the at least one processor, fields of a manual annotation user interface screen of the user interface for the sequence of events of the play with information based on the data describing the representative play sequence; and g) annotating the sequence of events of the play using (i) the information based on the data describing the representative play sequence populating the fields of the manual annotation interface, and/or (ii) data manually input to edit the populated fields of the manual annotation interface.

* * * * *